US010814795B2

(12) United States Patent
Bonenberger

(10) Patent No.: US 10,814,795 B2
(45) Date of Patent: Oct. 27, 2020

(54) ATTACHMENT SYSTEM FOR REMOVABLE STORAGE MODULE FOR GOLF CART

(71) Applicant: Frank Philip Bonenberger, Rockledge, FL (US)

(72) Inventor: Frank Philip Bonenberger, Rockledge, FL (US)

(*) Notice: Subject to any disclaimer, the term of this patent is extended or adjusted under 35 U.S.C. 154(b) by 0 days.

(21) Appl. No.: 16/416,208

(22) Filed: May 18, 2019

(65) Prior Publication Data

US 2019/0389393 A1 Dec. 26, 2019

Related U.S. Application Data

(63) Continuation of application No. 15/453,843, filed on Mar. 21, 2017, now Pat. No. 10,343,615, which is a continuation-in-part of application No. 14/167,922, filed on Jan. 29, 2014, now Pat. No. 9,623,808.

(60) Provisional application No. 62/394,729, filed on Sep. 14, 2016, provisional application No. 61/760,016, filed on Feb. 1, 2013.

(51) Int. Cl.
*B60R 9/06* (2006.01)
*B60R 9/08* (2006.01)
*A63B 55/60* (2015.01)
*B62D 21/14* (2006.01)
*B62D 21/18* (2006.01)
*B60K 16/00* (2020.01)

(52) U.S. Cl.
CPC .............. *B60R 9/065* (2013.01); *A63B 55/60* (2015.10); *B60R 9/08* (2013.01); *B62D 21/14* (2013.01); *B62D 21/183* (2013.01); *A63B 2210/50* (2013.01); *B60K 16/00* (2013.01); *B60K 2016/003* (2013.01); *B60K 2016/006* (2013.01); *B60Y 2200/86* (2013.01); *Y02T 10/90* (2013.01)

(58) Field of Classification Search
CPC .. B60R 9/065; B60R 9/06; B60R 9/08; B62D 21/183; B62D 21/14; B60K 16/00; B60K 2016/006; B60K 2016/003; B62B 2202/404; A63B 55/60; A63B 2210/50; B60Y 2200/86; Y02T 10/90
USPC ................ 224/274, 401, 403, 404, 497–499, 224/488–491, 452, 454, 524, 525
See application file for complete search history.

(56) References Cited

U.S. PATENT DOCUMENTS 3,687,344 A * 8/1972 Nixon ..................... B60R 9/065
224/519

* cited by examiner

*Primary Examiner* — Scott T McNurlen
*Assistant Examiner* — Matthew T Theis
(74) *Attorney, Agent, or Firm* — Gregory Stauf

(57) ABSTRACT

A storage unit intended for mounting on the rear of a golf cart type vehicle is designed to protrude from the rear of the golf cart to provide more storage space. The storage unit is further designed to be removable, and may be subdivided with movable partitions. Several features are described for its attachment onto the rear of the golf cart in different ways, including specific types of attachments and frameworks for use with and without rear shelf wells on the golf cart. These are designed for greater security in holding the storage unit onto the golf cart, and include adjustable or removable bottom protrusions for use with a rear shelf well, or the attachment frame system without a rear shelf well. In addition, a system is described to allow the storage unit to be folded, such that it can be more compactly folded and shipped, stored or transported.

18 Claims, 21 Drawing Sheets

ATTACHMENT SYSTEM FOR REMOVABLE STORAGE MODULE FOR GOLF CART

CROSS REFERENCE TO RELATED APPLICATIONS

This Continuation application takes its priority from a Continuation Utility application Ser. No. 14/167,922, filed Jan. 29, 2014, which takes its priority from Provisional Application 61/760,016, filed Feb. 1, 2013, both of which are incorporated by reference. That Continuation Application also takes priority from Provisional Application 62/394,729, filed Sep. 14, 2016, and Utility application Ser. No. 15/453,843, filed Mar. 21, 2017, both of which are incorporated by reference. As per the requirements of 1.78(6), the inventors hereby state that this nonprovisional application which is being filed on or after Mar. 16, 2013, claims the benefit of the filing date of a provisional application filed prior to Mar. 16, 2013 (Provisional Application 61760016), and also contains a claim to a claimed invention that has an effective filing date as defined in § 1.109 that is after Mar. 16, 2013.

BACKGROUND OF THE INVENTION

Golf carts, as envisioned for purposes of this invention, describe small vehicles which are generally permitted on golf courses, even if they are not used exclusively or at all on such. Most are electric, though some may be powered by fossil fuels including, but not limited to, propane, hydrogen or gasoline. These vehicles are also usually open on the sides and rear, though some may have flexible roll-down sides for protection from weather, and they may be modified aftermarket to add doors and other weather protection. By default, they tend to hold two passengers in the front and two golf bags on a rear shelf in the back. Some are available now with two forward facing seats, and two backwards facing seats, eliminating the rear golf bag ledge but holding 4 passengers, or with other configurations to hold 4 passengers.

While originally intended for use purely to transport golfers and their clubs around a golf course, golf carts have come into more widespread use as transports in a variety of situations. Some communities have been designed to avoid use of cars, and to permit transport on foot and via pathways accommodating golf carts. In other cases, individuals may wish to use a golf cart as a supplement or as a complete replacement for an automobile, for reasons including, but not limited to, loss of a driver's license, temporary or permanent incapacity, or desire to use purely electric transportation for ecological or self sufficiency reasons. In some communities, golf carts are permitted to drive on specific public roads. When a golf cart is used in these ways, as a primary vehicle for an individual or a family, a need exists for more storage capacity, storage security and flexibility than a golf cart normally provides.

Storage on a normal golf cart includes only a small wire basket or two, intended for holding small items like a hat or sunglasses, one or two glove boxes which are not normally lockable, and a shelf or well in the back for holding two sets of golf clubs. Since a golf cart is normally used only for golfing in good weather, storage areas are not protected from inclement weather such as rain or temperature extremes. Since it is also normally attended by the golfers for the full time it is on the course, the storage provides little or no security for items being transported. Finally, there is little flexibility in storage, as its primary storage area is configured to hold nothing more or less than two bags of golf clubs.

REFERENCES

U.S. Patent Applications 61/760,016 (Provisional) and Ser. No. 14/167,922 (Utility), Frank Bonenberger, Removable Storage Module for Golf Cart.
U.S. Pat. No. 5,344,020, Steve Ferguson, Storage Device for Golf Carts
U.S. Pat. No. 5,788,070, Robert K. Banker, Golf Equipment Storage Device
U.S. Pat. No. 6,641,192 B2, Charles R. Eschenfelder, Storage Cabinet for Use in a Golf Cart
U.S. Pat. No. 5,056,695 A, Allen L. Giblet
U.S. Pat. No. 5,095,718 A, Ormond et. al.
U.S. Application #2010/0065593 A1, Campbell et. al.
U.S. Pat. No. 6,457,317 B1, Michael O'Donnell
U.S. Pat. No. 6,845,895 B2, Jones et. al.
U.S. Pat. No. 5,947,356 A, Ronald C. Delong
U.S. Pat. No. 7,093,872 B2, Stanfield et. al.
U.S. Pat. No. D463,999 S, Beck et. al.
U.S. Pat. No. 6,209,941 B1, Gary Cross
U.S. Application #2003/0015562 A1, Cassy C. Jones
U.S. Application #2008/0217194 A1, Fred Lewter
U.S. Pat. No. 7,418,311 B1, Paul J. Lagassey
U.S. Application #2005/0194414 A1, Richard Quentin Lynch
U.S. Pat. No. 7,942,295 B1, John Hume

SUMMARY DISCLOSURE OF INVENTION

The invention described herein relates generally to a golf cart mounted storage unit, and solves these and other problems as described below. Features of this invention should include the ability to protect items being transported from rain, theft and temperature extremes. It should allow some reconfiguration to accommodate different sizes, shapes and types of items. In addition, it would be desirable to have this storage unit be removable from the golf cart, so that the cart could be used for its original purpose of transporting golf clubs, and ideally the unit should be collapsible so that it would require less storage space when not in use on the cart. This would also allow for easier and cheaper shipping of the unit. This invention provides these advantages.

In one embodiment, the invention described herein relates generally to a storage unit which can be attached in place of the golf bags, sitting in the "well" or depression in the ledge on the back of the golf cart which normally holds the bottoms of the golf bags in place. It would occupy the majority of the space above said well, and is thus intended for use on a golf cart when the golf cart is being used for more general purposes than golfing, as it would occupy the space normally reserved for golf clubs. In a preferred embodiment, this storage unit will be removably attached to the back of the golf cart. In another preferred embodiment, this storage unit will extend beyond the rear of the golf cart to provide a larger storage volume than would be possible if it merely occupied the space above said well. This well would have a bottom surface, on which the bottoms of golf bags would normally rest, and four walls, a front wall, two side walls and a rear wall.

In another embodiment of this invention, there is a protrusion downwards from the bottom of the storage unit into a "well", or depression, which is normally present in the back well of a golf cart to hold the bottoms of the golf bags in place. This protrusion would be adjustable or interchangeable with other variant protrusion configurations in order to adapt to the wells on different models of golf carts.

In another embodiment of this invention, there is no rear platform with well on the golf cart, but rather a pair of rear facing seats or bench seat to provide seating for four (with the two normal front facing seats in the front of the cart). To the rear of this seat or seats is a platform without a well, for the rear passengers to place their feet on. The storage unit would be attached immediately behind this platform. In some embodiments of this invention, the bottom of the storage unit may rest partly on the platform. In some embodiments of this invention, a frame, which may be affixed or removable, is attached to the back of the golf cart and the storage unit is attached to the frame.

Another embodiment of this invention has this storage unit built out of lightweight materials, so that it can be easily removed from the golf cart if it is desirable to use said cart for golfing. This is also desirable for shipping or otherwise transporting said storage unit, whether before or after it is assembled. In a preferred embodiment, this storage unit will be removably attached to the back of the golf cart.

Another embodiment of this invention has the storage unit built in such a way that it can be folded for removal, shipping or storage. This may include any combination of rigid sections and flexible sections either or both of which can be manipulated in ways including, but not limited to, folding, telescoping and bending. In a preferred embodiment, there would be hinges at each vertical corner of the storage unit to enable its folding. In a preferred embodiment, this storage unit will be removably attached to the back of the golf cart.

Another embodiment of this invention has provisions for internal storage of items. These provisions may include, but are not limited to, shelves, hooks, straps, internal dividers, and brackets, which may be removable and/or movable to different locations. External attachments for items may also be present, such as, but not limited to, hooks, straps, elastic bands, and brackets. In a preferred embodiment, this storage unit will be removably attached to the back of the golf cart.

Another embodiment of this invention may include climate control of part or all of the interior. This may be helpful for keeping hot items, such as hot food being picked up or delivered, hot, or may be helpful for keeping cold items, such as perishable groceries, cold. Different sections of the storage unit may be kept hot, cold, or may not be conditioned. Power for this climate conditioning can be drawn from the battery system of the golf cart. Other possible sources include, but are not limited to, an electrical line run to a nearby outlet, solar power, or wind power. In a preferred embodiment, this storage unit will be removably attached to the back of the golf cart.

BRIEF DESCRIPTION OF DRAWINGS

FIG. 4f shows a top view of an attachment bracket to fasten the upper portion of the storage unit to the rear of the golf cart, while

MODE(S) FOR CARRYING OUT THE INVENTION—DETAILED DESCRIPTION

Figure 1A:
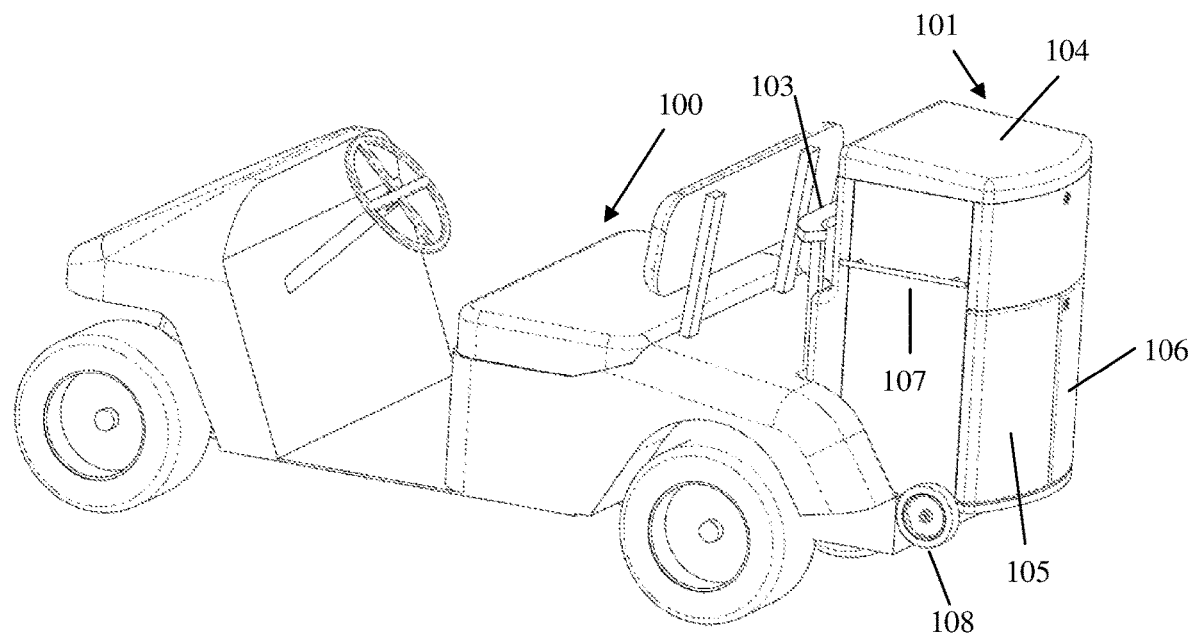
FIG. 1a shows an embodiment of a storage unit mounted on the rear end of a golf cart, with enumerated parts.

The present invention and its various embodiments are described below, with reference to figures as necessary. Reference numbers are used to match particular elements described in the text with those shown in figures. Although the embodiments disclosed will be described with reference to the embodiments shown in the drawings, it should be understood that the embodiments disclosed can be embodied in many alternate forms of embodiments, and that aspects of different embodiments can be combined freely. In addition, any suitable size, shape or type of elements or materials could be used.

Figure 1B:
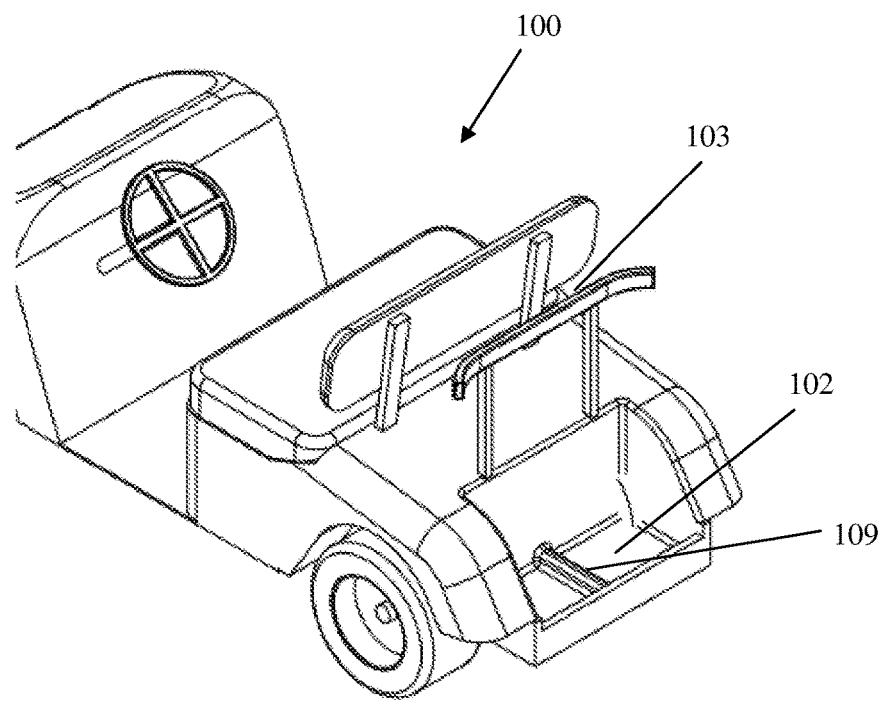
FIG. 1b shows the rear of the golf car without the storage unit.

Generally speaking, the present invention as shown in FIGS. 1*a* and 1*b* provides additional storage space for a vehicle 100 such as, but not limited to, a golf cart. While the majority of embodiment descriptions relate to a golf cart, they can clearly be applied to storage units on the rears of a variety of other types of vehicles, land or sea. The invention describes a storage unit 101 or container suitable for mounting on the back of a golf cart. In a preferred embodiment, this storage unit 101 would occupy the entire back side of the golf cart 100, and would allow the driver to see over the top of it to the rear, or through the top if part or all of the storage unit 101 were made of transparent materials. The storage unit is essentially cuboid in shape, having six approximately rectangular faces or panels. Note that for streamlining or appearance purposes, the faces or panels may be curved, such that two or more faces are only very approximately rectangular, and more closely approximate triangles or arcuate sections. The definition of "cuboid" used herein is intended to include such deviations of faces or panels from rectangularity. The storage unit is designed to be easily removable from the golf cart. In one embodiment, the golf cart 100 has a protruding rear shelf with a well 102 which would provide support for the storage unit 101, and a frame system 103 which provides an upper attachment point for the storage unit 101. This well potentially allows for use of various systems to lock the bottom of the storage unit 101 on to the rear of the golf cart and attach the rear of the storage unit to the frame 103, both which will be discussed in more detail later. Well 102 may have a center rib 109 which divides the well 102 so that it can hold two golf bags. This center rib may take a variety of forms in different models of golf carts, and will be discussed later in conjunction with various storage unit bottom protrusion systems.

The first embodiment of the storage unit shown has a top door 104, which opens upward, and two front doors 105 and 106. It also has a handle 107 and another on the far side (not shown) to lift the storage unit from the back of the golf cart, and a wheel 108 paired with another wheel on the far side (not shown) to roll the storage unit around when it is separated from the golf cart. These wheels may be removably attached or folded up out of the way when the storage unit is being used on the back of a vehicle. As shown, they are designed to extend below the bottom horizontal plane of the bottom panel of the storage unit when deployed so that the storage unit can be rolled.

The storage unit is designed to be of lightweight construction and thus easily removable. In a preferred embodiment, the construction is largely of plastic such as, but not limited to, polycarbonate, polystyrene, PVC (poly vinyl chloride), HDPE (high density polyethylene), and PE (polyethylene). In another embodiment, the construction is largely of fiberglass. In either case, this makes it weather resistant, inexpensive and light weight, with metal fittings as needed for hinges, door locks, and so on. In other embodiments, the storage unit may be constructed of light weight rigid or semi-rigid frame materials with panels connecting them. In a preferred embodiment these rigid or semi-rigid frame members may be made of lightweight material such as, but not limited to, carbon composite rods, or hollow metal tubes of square or round cross section, with rigid or semi-rigid, such as plastic suitcase type material, used for panels between the frame pieces. The panels could instead be flexible sections made of materials such as, but not limited to, cloth such as canvas, ballistic nylon or flexible plastic, which can be inserted or removed from this or a similar framework. In one particular embodiment, the panels could be made out of flexible material such as, but not limited to, canvas surrounding the framework. In any case wherein flexible material such as fabric is a primary panel construction system, zippers could be used to open any doors and partitions could similarly be partially or completely removed by means of zippers.

Figure 2A:
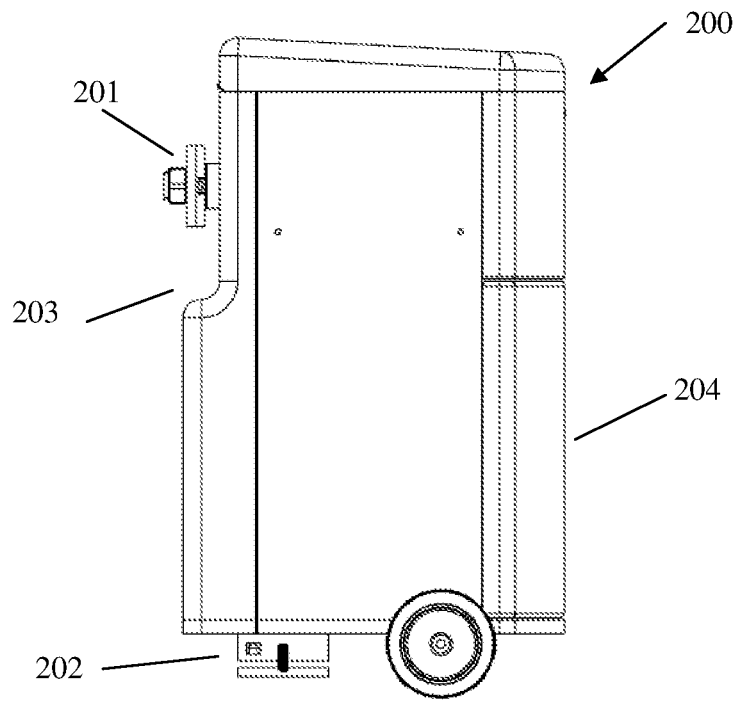
FIG. 2a shows an embodiment of a storage unit from the side.

The storage unit must be fastened to the golf cart. As shown in FIG. 2*a*, in the first embodiment of this invention, storage unit 200 has two attachment points, upper attachment point 201 in the upper rear to fasten to the frame of the golf cart, and adjustable downward protrusion 202 underneath to act as a lower attachment point, which fits into the well 102 of the golf cart rear shelf. The downward protrusion 202 could, in a preferred embodiment, be adjusted so that it makes contact with some combination of the upper surface of the bottom of the well 102 and one or more interior side surfaces of the well. Protrusion 202 could, in non-limiting examples, contact the bottom of the well and the rear side wall, or the front side wall and rear side wall, or the left side wall and right side wall. Note that while only one upper fitting 201 is shown, more than one could be used for reasons of stability and strength of attachment. For reasons of stability of the storage unit on the back of a moving vehicle and mounting strength, it is desirable to have upper attachment point at least 30% of the height of the storage unit up the rear of the storage unit from the bottom of the storage unit. In a preferred embodiment the upper attachment point is at least 45% of the height of the storage unit up the rear of the storage unit from the bottom of the storage unit.

Also shown is indent 203 on the back of the storage unit, which allows it to fit onto the back of a typical golf cart and to meet up with appropriate parts of the frame. By having the lower rear panel jut out as shown, in addition to allowing fitting 201 to be recessed relative to the lower back of the storage unit, to make space for the fitting, indent 203 also allows protrusion 202 and its other variants (such as non-adjustable protrusions, built in and detachable) to be mounted further towards the front of the golf cart, and thereby provide a more stable lower attachment point. This rear panel indent 203 may range from 2" to 8" in depth, with a preferred distance of 4" to 5". In an alternative embodiment, the entire rear of the storage unit could be flat, which may reduce manufacturing costs but does not allow quite as much space in the lower compartment behind lower doors 204 (105 and 106 in FIG. 1*a*).

Figure 2B:
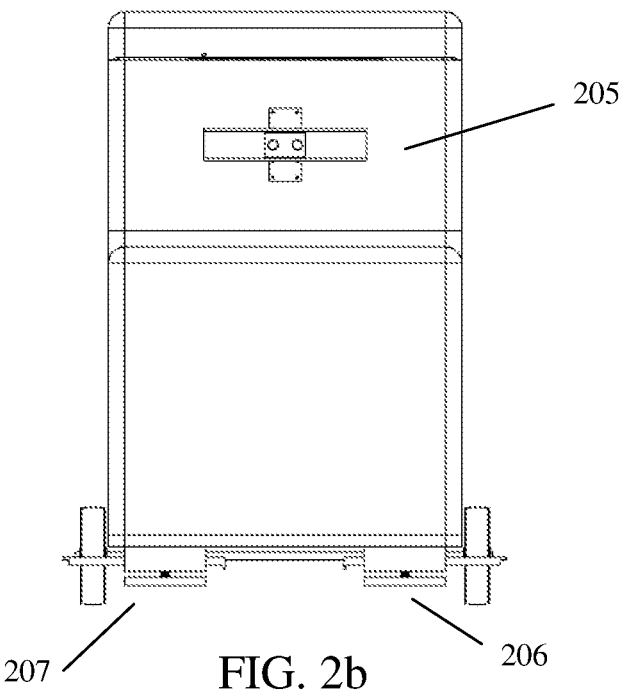
FIG. 2b shows an embodiment of a storage unit from the rear.

A golf cart typically has a rear framework which, in addition to supporting the roof of the golf cart, if any, provides a location to strap golf bags to, in order to keep them on the rear shelf of the cart. A portion of this frame can be seen in FIG. 2*b*, as item 205. This corresponds to a segment of the horizontal frame section 103 shown in FIG. 1*b*. A golf cart frame typically has a horizontal cross piece like 103 which extends across the width of the back of the cart, to support the upper parts of the golf bags when they are strapped in. This allows a single upper attachment fitting 201 to be used, though more than one may also be used for a more stable attachment of the storage unit. In this embodiment, two lower adjustable downward protrusions 206 and 207 are shown, one for each side of the rear shelf well. Other configurations would allow a single adjustable downward protrusion.

Figure 2C:
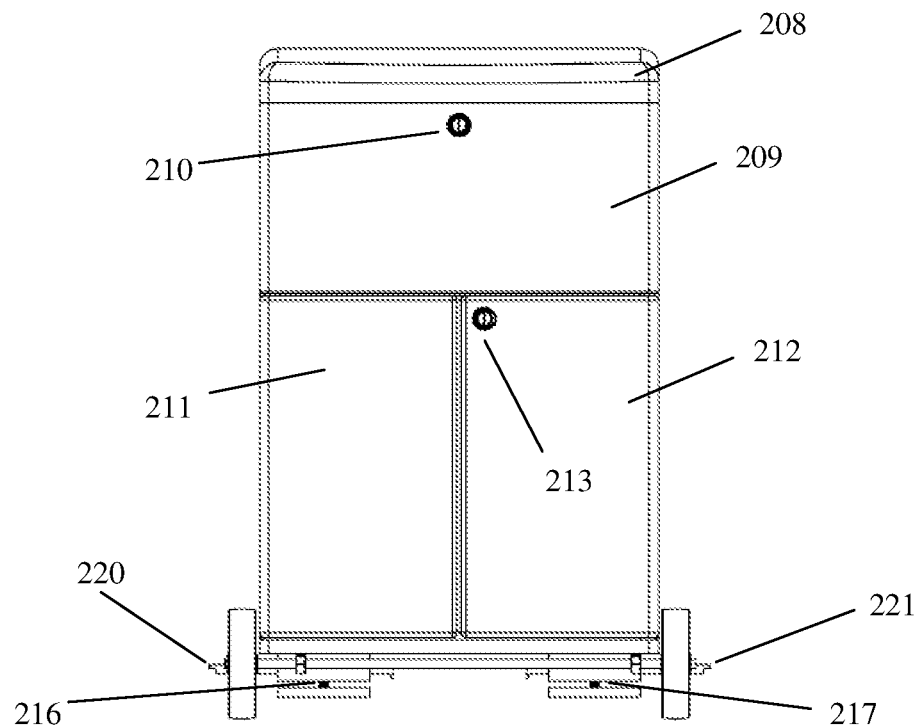
FIG. 2c shows an embodiment of a storage unit from the front.

FIG. 2*c* shows a front view of the first embodiment of the storage unit. While many door combinations can be used and are intended to be covered in this invention, in this preferred embodiment, top door 208 opens up and towards the back of the storage unit, with one or more hinges on its rear edge. Front panel 209 does not move and has a lock, 210, which can lock the top door, preventing it from opening. Front doors 211 and 212, which correspond to doors 105 and 106 in FIG. 1*a*, open outwards from the front of the storage unit, exposing the lower compartment of storage unit 200. They can be locked closed with lock 213. This configuration can allow an insulated liner to be placed in the top compartment under door 208 and behind panel 209. This allows storage of items such as groceries which must be kept cold or hot during transport. Keeping items cold is particularly important since golf carts are used as a primary vehicle which may be needed to transport groceries most commonly in warm climates.

It is also envisioned in this invention to have a provision to subdivide the interior of the storage unit by using fixed or removable horizontal shelves and/or vertical partitions. In the preferred embodiment shown, there would be a top compartment, accessible by upward opening top door 208, and a lower compartment, accessible behind front doors 211 and 212. Having the shelf between these two compartments removable would allow larger objects, such as bags of mulch or brooms, to be carried in the storage unit. In addition, it is envisioned to have interior and exterior fastening points and systems. Hooks are particularly advantageous for hanging grocery bags inside the storage unit. These hooks may include, but are not limited to, open hooks or "snap-ring" hooks. The straps may include, but are not limited to, fixed straps, elastic straps such as "bungee" type cords, and straps with tightening systems such as ratchets.

Figure 2D:
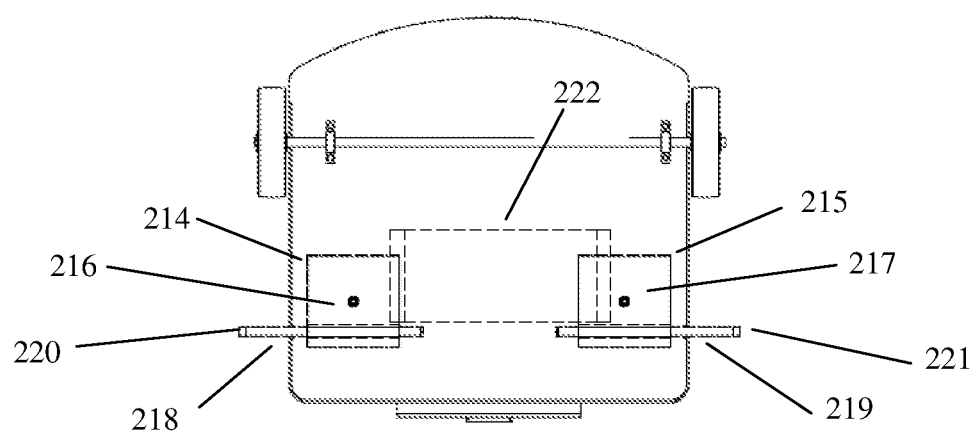
FIG. 2d shows that embodiment of a storage unit from the bottom.

FIG. 2*d* shows a bottom view of the first embodiment of the storage unit. Plates 214 and 215 are mounted on legs 216 and 217, on which they may be able to both pivot and extend downwards from the bottom of the storage unit to match the depth of a golf cart well such as item 102 in FIG. 1*b*, thereby contacting the bottom of the golf cart well interior and thereby helping to support the storage unit and lock it in place on the back of the golf cart. In a preferred embodiment they do not pivot, but merely extend upwards and downwards. Each plate 214 and 215 has a corresponding extendable arm 218 and 219, which can brace the bottom protrusion of the storage unit against the side walls of the golf cart well, locking the bottom of the unit in place. This extension and bracing can take place by using mechanical systems including, but not limited to, screw threads, ratchets, springs, or telescoping sections with locks, or by any combination of these systems. Note that in this embodiment of the adjustable protrusion invention, there are two small extensions or tabs 220 and 221, also shown from the side in FIG. 2*c*. These tabs can have a variety of cross sections, including but not limited to, round, square, or flat and plate-like. These tabs can go into slots or holes either cut into the sides of the golf cart rear shelf bag well, or fittings with slots or holes mounted onto the two sides of the golf cart rear shelf bag well, thus locking the bottom of the storage unit 200 in place on the rear of the golf cart in a front-back direction as well as in other directions such as up-down and left-right. In addition to these tabs potentially being of different sizes and configurations, they may not be present at all, if adequate locking of the bottom of the storage unit into the golf cart rear shelf well takes place without them. Locking the bottom of the storage unit into place in a side to side direction would then be accomplished by extending the arms 218 and 219 until they press against the side walls of the bag well. Finally, access panel 222 in the bottom of the storage unit can be opened from inside the storage unit to reach through and access the adjustable protrusions, in particular sliding arms 220 and 221. This allows the unit to be placed on the rear shelf bag well, and after it is placed the sliding arms can be adjusted under the storage unit through the access panel opening to generate a secure fit of the bottom protrusion under the storage unit in the rear shelf bag well, helping hold the entire storage unit in place. Depending on the mechanisms used to extend the sliding arms, and thus the number and location of access points needed, the access panel 222 may have different sizes, locations and configurations on the bottom of the storage unit, and may take the form of multiple access panels rather than merely one.

Figure 2E:
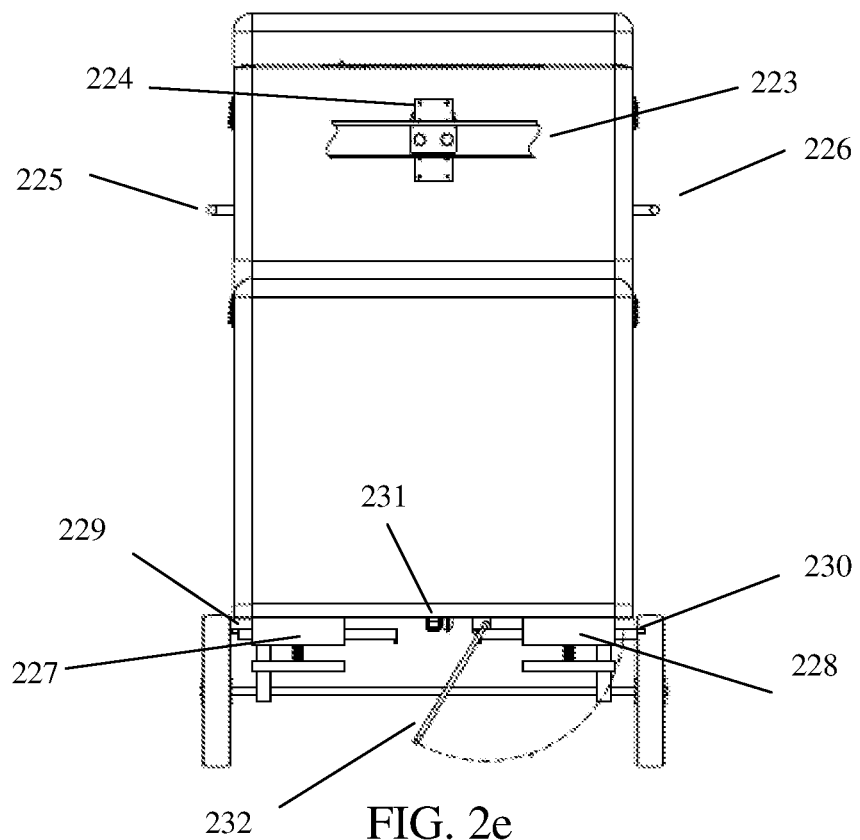
FIG. 2e shows another embodiment of the storage unit from the rear.

FIG. 2*e* shows a rear view of a second embodiment of the storage unit, with a section of the golf cart frame cross brace 223 and a vertical plate 224 for an upper attachment point, to be discussed in more detail later. On the sides of the storage unit are shown handles 225 and 226, to help remove the storage unit from the golf cart platform. Below the bottom of the box is another embodiment of an adjustable bottom protrusion. In this embodiment, in addition to the two side leg/plate combinations 227 and 228 with extendable side arms 229 and 230 seen in the previous embodiment, we also see a center extendable arm 231, and a kick stand 232, with a dotted line showing the arc of its swing. This kick stand would allow the storage unit to stand level on its front wheels and kick stand when it is not mounted on the golf cart rear shelf.

Figure 2F:
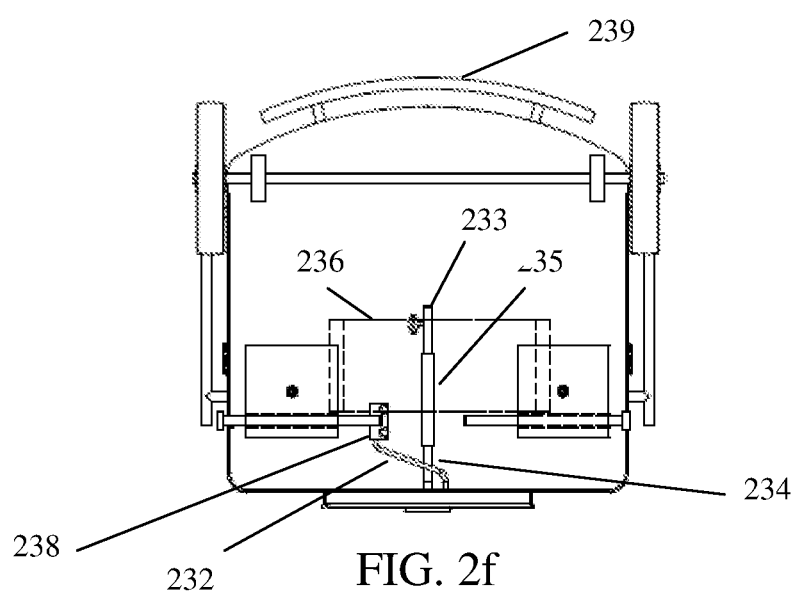
FIG. 2f shows that embodiment of the storage unit from the bottom.

FIG. 2*f* shows a bottom view of the second embodiment of an adjustable bottom protrusion. Center extendable arms 233 and 234 slide into holder 235, which is attached to the bottom of the storage unit, taking care not to attach the holder to removable panel 236 unless it is considered desirable to remove an extendable arm for adjustment. Note that although the arms 233 and 234 are described as sliding into holder 235, the extension and bracing of these arms 233 and 234 against the inner front and back walls of the rear golf cart shelf well can take place by using mechanical systems including, but not limited to, screw threads, ratchets, springs, or telescoping sections with locks, or by any combination of these systems. It should be possible, as with the first embodiment, to remove the panel 236 and adjust the side to side bracing or locking arms like 217 and 218 in the previous embodiment and front-back bracing or locking arms 233 and 234. In a preferred embodiment, only one arm, either 233 or 234, is used to brace against one interior wall of the well, with an access panel 236 positioned to access the one adjustment location where that arm can be extended or retracted. Kick stand 232 is shown again, with its pivot point 238. Front handle 239 is also shown, in the embodiments of the storage unit shown so far handle 239 would be mounted on the upper section of the storage unit 209, from FIG. 2*c*.

Figure 2G:
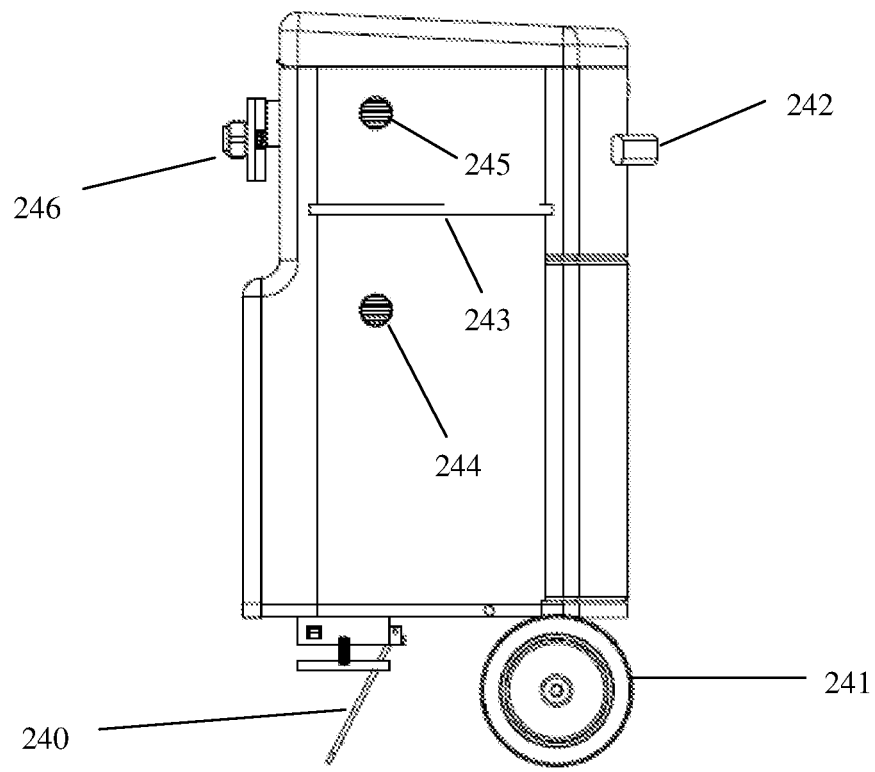
FIG. 2g shows another embodiment of a storage unit from the side.

FIG. 2*g* shows a side view of a third embodiment of this invention, with a different kick stand configuration 240 from the second embodiment. Note that as in the second embodiment, kick stand 240 is designed to extend down as far as needed based on the axel location and diameter of wheel 241 such that the bottom of the storage unit is approximately level. Thus, different mounting locations and sizes of wheel 241 and its matched wheel on the other side can dictate design and size of kick stand 240, and vice versa. Also shown are front handle 242, one side handle 243, a side ventilation opening 244 and 245, and upper rear attachment point 246.

Figure 2H:
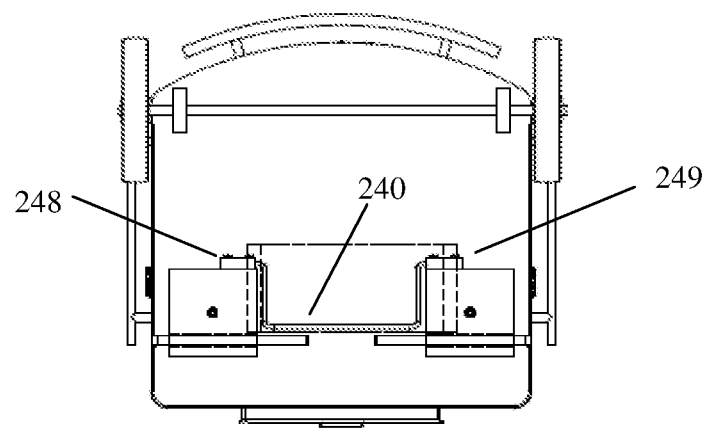
FIG. 2h shows that embodiment of the storage unit from the bottom.

FIG. 2*h* shows a bottom view of the third embodiment, with bottom plates and extendable arms similar to those shown in FIG. 2*d*. The kick stand 240 shown here is U-shaped, with two pivot points 248 and 249. The pivot points could be moved elsewhere, clearly, depending on the configuration of the access panel, bottom plates and adjustable arms. Also note that in other embodiments not shown in figures a second set of wheels could be used in addition to 214, shown, which could fold out or attach, rather than a kick stand, in order to hold the storage unit level. This would have the disadvantage of greater expense and complexity, but the advantage of being able to wheel the storage unit around without having to tilt it onto two wheels, making it easier to move for someone with strength or mobility impairments.

Figure 3A:
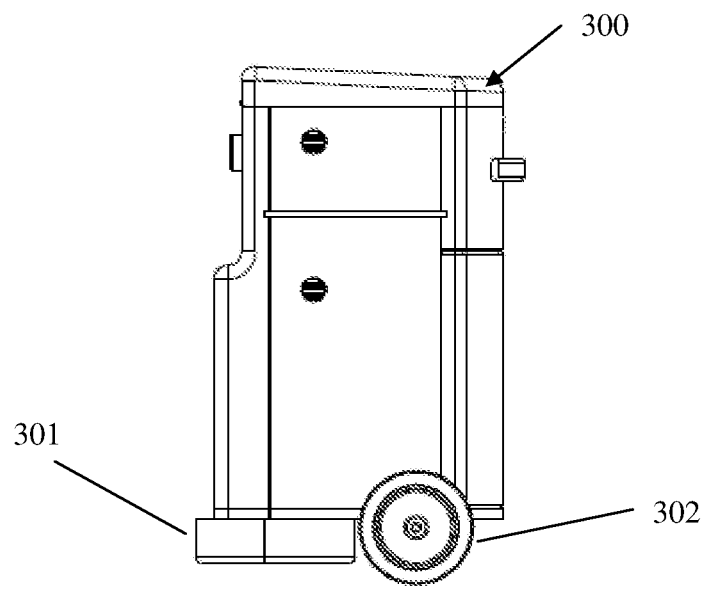
FIG. 3a shows an embodiment of a storage unit from the side.

FIG. 3a shows a side view of a fourth embodiment of the invention, with a fixed bottom protrusion. Bottom protrusion 301 extends downwards from the bottom of storage unit 300, in particular below the bottom horizontal plane of the bottom panel of the storage unit. While in this embodiment the rear of the bottom protrusion 301 also extends slightly behind the rear panel of storage unit 300, clearly the bottom protrusion 301 may also be aligned with the rear of the storage unit, or offset towards the wheels, depending on the configuration of the rear of the golf cart, the configuration of the rear shelf well and the bottom and rear attachment mechanisms of the storage unit. In addition, while this embodiment shows the bottom protrusion 301 covering roughly half of the bottom of the storage unit, meaning that roughly half would be on the rear shelf 102 and about half would protrude behind the back of the golf cart, other ratios would also work for this invention. It is desirable to have at least some extension of the storage unit, equal to at least 10% of the depth of the storage unit (front to back distance between the lower parts of the outsides of the front and rear panels of the storage unit), behind the rear of the vehicle, so that the storage unit has enough depth to provide reasonable storage space. It is also desirable to not have too much extension of the storage unit past the rear end of the vehicle, no more than 80% of the depth of the storage unit, so that it does not take up too much space parking or become a driving hazard. It is also desirable to have the bottom protrusion 301 extend downwards far enough to contact or nearly contact the interior bottom of the rear well of the golf cart, in the case that a well is present, thereby helping to support the storage unit 300 and lock it onto the rear of the golf cart, since it would not be possible to remove the storage unit without raising it up so that the bottom protrusion can clear the rear wall of the well. The downward protrusion 301 could, in a preferred embodiment, be sized so that it makes contact with some combination of the upper surface of the bottom of the well 102 and one or more interior side surfaces of the well. Protrusion 301 could, in non-limiting examples, contact the bottom of the well and the rear side wall, or the front side wall and rear side wall, or the left side wall and right side wall.

Figure 3B:
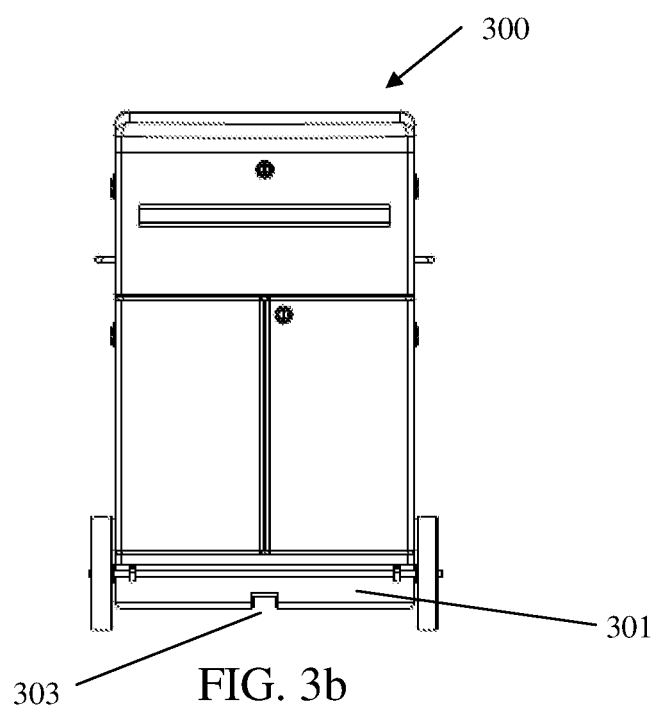
FIG. 3b shows that embodiment of a storage unit from the front.

FIG. 3b shows a front view of the fourth embodiment of the invention, where the bottom protrusion is not adjustable to fit different rear shelf wells on different golf cart models but is interchangeable. A feature of this non-adjustable embodiment of the bottom protrusion is that it can be designed to be removable and interchangeable with bottom protrusions designed to fit other rear shelf wells on other models of golf carts. In this way, the storage unit can be universal, with just a relatively inexpensive and compact bottom protrusion part changed to allow for use of the storage unit on different golf cart models. Bottom protrusion 301 can be seen extending downwards from the bottom panel of the storage unit 300. In the center of bottom protrusion 301 can be seen downwards facing channel 303, which in this embodiment extends from the front to the back of the bottom protrusion. This channel is designed to fit over ridge 109 from FIG. 1b, a front to back separator found in many models of golf cart on the rear shelf well to separate the two golf club bags. The channel 303 may be designed to be a tight fit, to help hold the bottom of the storage unit in place, or may be oversized and loose if it is desired to allow for a wider variety of models to be fit with one bottom protrusion. In a preferred embodiment of this channel, it is designed to be large enough to accommodate a center ridge like 109 in all golf cart models. The interior walls of this channel, or channel having interior wall locations modified with an insertable bushing, may fit snugly against the sides of the center ridge, helping hold the storage unit in place as a lower attachment point.

Figure 3C:
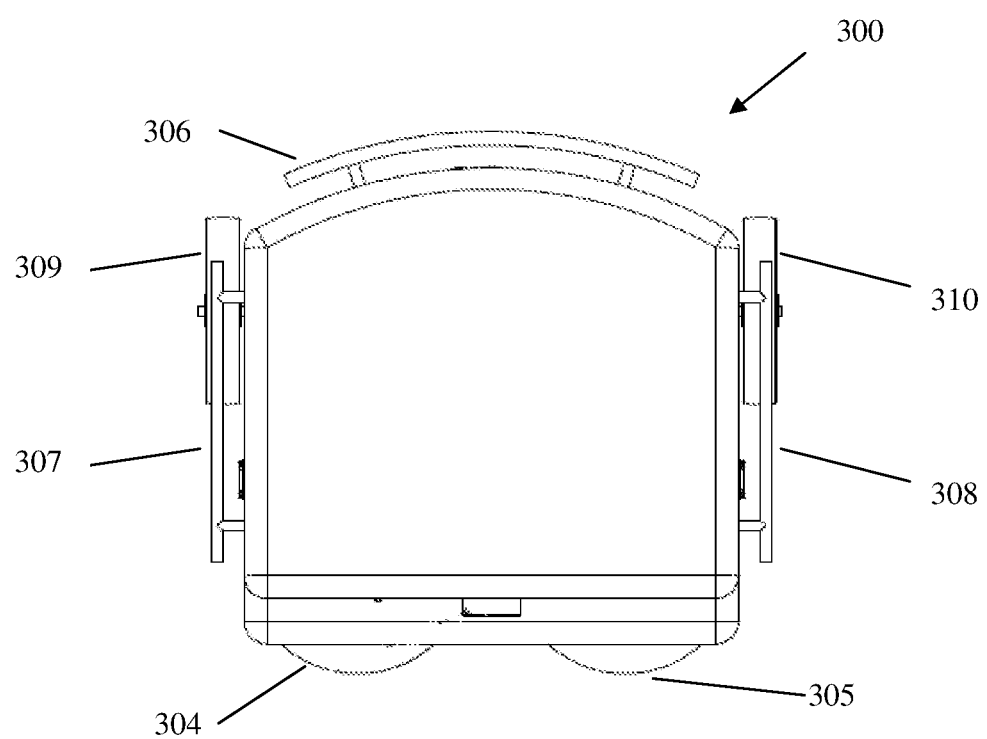
FIG. 3c shows that embodiment of a storage unit from the top.
Figure 3D:
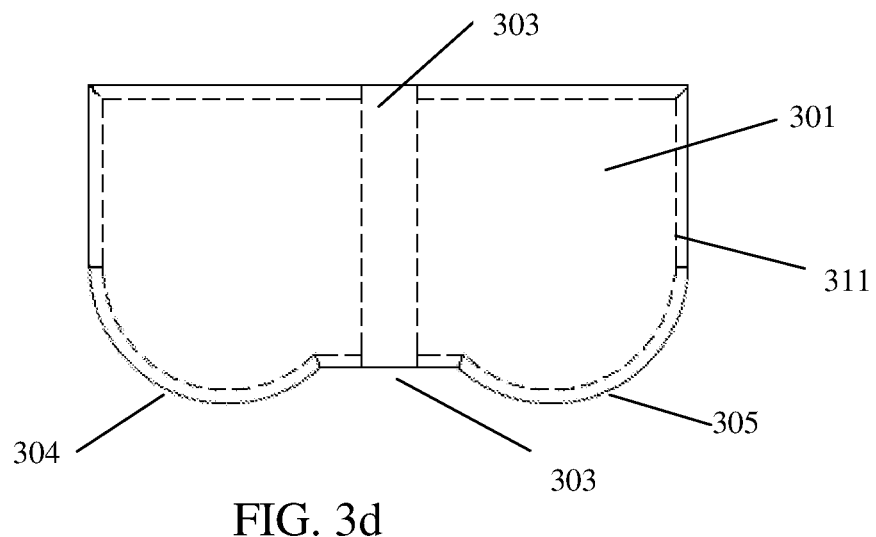
FIG. 3d shows a bottom view of a removable portion of the bottom protrusion of that embodiment of a storage unit.

For further clarity, FIG. 3c shows a top view of the storage unit with portions 304 and 305 of the bottom protrusion extending behind the rear panel of the storage unit. Also shown are front handle 306, side handles 307 and 308, and wheels 309 and 310. FIG. 3d shows a top view of the detached protrusion 301, with a dotted line 311 indicating a slightly beveled section at the bottom of the protrusion, where it would rest in the bottom interior corner of the rear shelf well of the golf cart, where the vertical side wall and bottom floor of the well intersect. As these rear shelves are often molded out of plastic or fiberglass, they often have rounded interior corners, so a matching bevel or curve in the outer corner of the protrusion lets the sides and bottom of the protrusion fit snugly into place in the rear shelf well. Locations 304 and 305 are shown where the bottom protrusion in this embodiment extends horizontally beyond the rear panel of the storage unit, as shown in FIG. 3c. These horizontally extending, curved portions 304 and 305 may be useful for certain golf cart models which have corresponding upwardly protruding sections which create corresponding curves in the interior vertical walls in their rear shelf wells in their frontward sides, the sides closest to the front of the golf cart. When properly sized and shaped, sections 304 and 305 can fit against several models of golf cart rear shelf well upward protrusions or interior well wall curves. Providing for the downward protrusion to brace against at least two interior well walls, and possibly three or four interior well walls, as well as possibly contacting the bottom of the well, helps to hold the storage unit in place as a lower attachment point. Note that while this bottom protrusion is shown with lobe portions extending beyond the rear panel of the storage unit, in other embodiments the portions may be aligned with the rear panel of the storage unit, or recessed from the plane of the rear of the storage unit, causing the bottom panel of the storage unit to extend over the bottom protrusion, depending on the configuration of the rear shelf well of a specific model of golf cart. Typical widths for lobe sections 304 and 305 are between 6" and 10", with a preferred width of 8", while the flat space between lobes 304 and 305 may have typical widths of 4" to 6", with a preferred width of 5", and typically the bottom protrusion would be aligned with the rear of the storage unit. Thus each lobe occupies approximately between 30 and 45% of the total width of the lower protrusion, with a preferred portion of 35-45% of the total width. A typical length in the perpendicular direction (front to back direction relative to the golf cart) for the bottom protrusion would be 8" to 12", with a preferred length of 9" to 10". Channel 303 is also shown, and is discussed in more detail below. It is also possible to use bolts, screws, pegs or other such mechanisms as known to those skilled in the art passing through either the rear bumper or the bottom of the rear well on the golf cart into the lower protrusion to help fasten the storage unit on to the back of the golf cart.

Figure 3E:
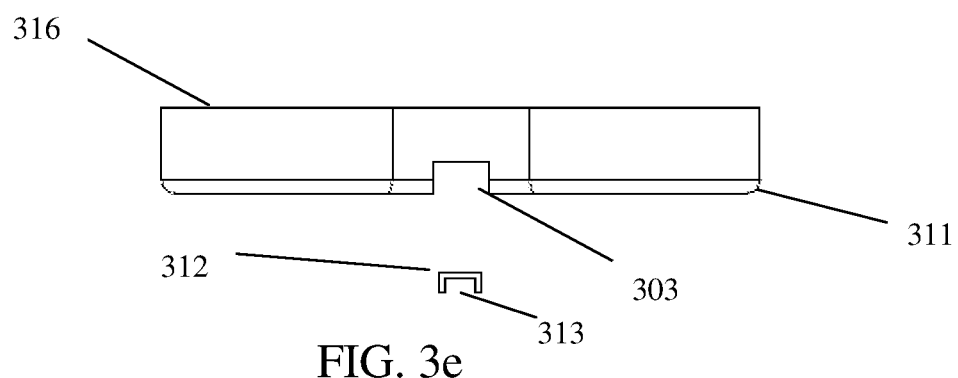
FIG. 3e shows a front view of the removable portion of the bottom protrusion of that embodiment of a storage unit.

FIG. 3e shows a rear view of the protrusion, with the bevel 311 and channel 303. Also shown is a removable insert or bushing 312 which can be placed into the channel 303 to change the cross sectional profile of the channel. The bushing 312 may change the transverse cross sectional profile, thereby make the interior width of the channel narrower, or change the longitudinal cross sectional profile, thereby making the length of the channel shorter, to accommodate specific golf cart models which have narrower or shorter ridges in their rear shelf wells. This channel 303 may range in width from 1.5" to 2.5", with a preferred width of 2", so the bushing may range in width over the same range, with the slot 313 in the bushing ranging from 1" to 2", with a preferred width of 1.5".

Figure 3F:
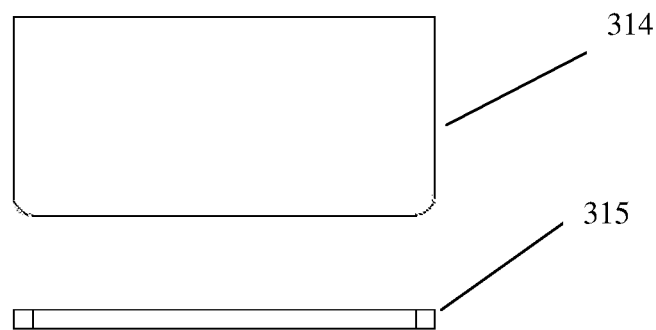
FIG. 3f shows a top and side view of a spacer for that removable portion of the bottom protrusion.

FIG. 3f shows a top view 314 and a front view 315 of a spacer which may be used to adjust the height of the bottom protrusion 301 of the storage unit to accommodate different well 102 depths on the rear shelf of different models of golf carts. In a preferred embodiment this spacer would fit between the top surface 316 of the removable bottom protrusion 301 and the bottom of the storage unit 300, though in an alternative embodiment it could fit between the bottom surface of the removable bottom protrusion and the upper surface of the golf cart rear well. It could have thicknesses ranging from 0.25" to 2", with preferred thicknesses of 0.5" and 1". This brings total bottom protrusion thicknesses to a range of 1.5" to 4", with preferred thicknesses of 1.75" to 3". In other embodiments, approximately horizontal spacers could be attached to the outside walls of the bottom protrusion 301 to provide a tighter fit with interior walls of the rear golf cart shelf well, and/or could be attached to the inside walls of the rear golf cart well to provide the tighter fit of the bottom protrusion. In either case, providing a snug fit of the bottom protrusion against the interior walls of the rear golf cart shelf well can help provide a secure lower attachment point for the storage unit.

Note that while only one large protrusion is shown in the diagram, it is obvious that multiple smaller protrusions in a variety of sizes and positions could be used to provide secure footing for the storage unit. This allows the storage unit to fit on a variety of rear shelves having different wells, including no well, found on different models of golf carts or other vehicles.

Figure 3G:
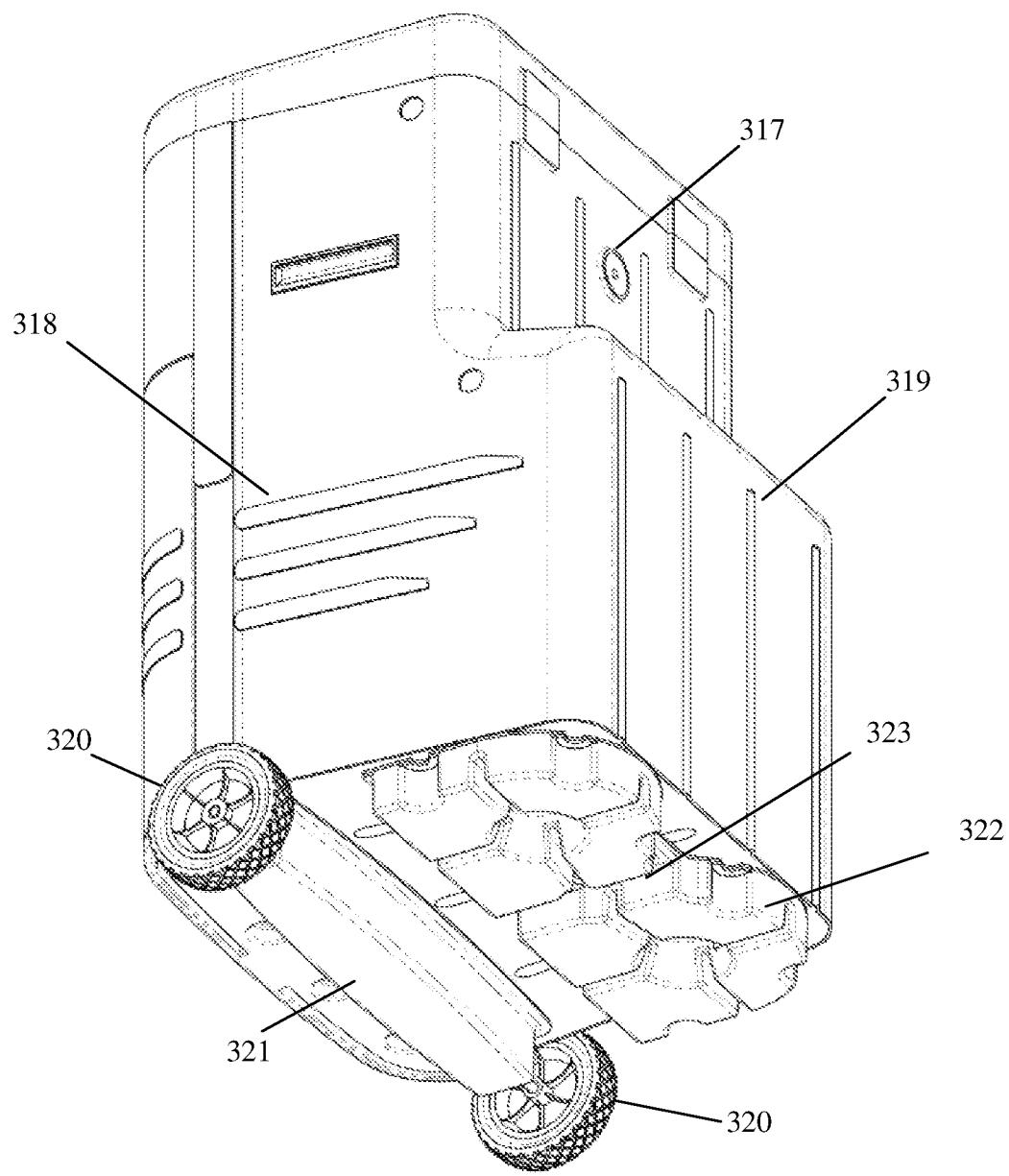
FIG. 3g shows a perspective view of the bottom, side and rear of an embodiment of a storage unit.

FIG. 3g shows another embodiment of the storage unit. Upper rear attachment point 317 is shown, with, but not limited to, a cone shaped receptacle for attachment which will be discussed later. This embodiment also shows stiffening ribs 318 on the side and 319 on the rear of the storage unit, which allows thinner materials to be used in the walls while retaining enough wall strength to withstand holding loads on the back of a vehicle which may be bouncing over curbs and potholes. While horizontal 318 and vertical 319 stiffening ribs are shown, other combinations including, but not limited to, diagonal and criss-cross ribs may also be used. These ribs may protrude only inside the storage unit, or only outside, or both inside and outside, depending on molding and manufacturing constraints. If they protrude on the outside they may also be incorporated as decorative elements, potentially including logos or insignia. They may also be concentrated in areas where more structural strength may be needed, such as around door latches or upper attachment point 317.

On the bottom of the storage unit 316 of FIG. 3g can be seen wheels 320 and axel containing lower protrusion 321. Together these form one type of wheel assembly which can be used with this storage unit. In one preferred embodiment of the wheel assembly, the wheels may have a solid axel which extends throughout protrusion 321 and no other mechanism, allowing the wheels 320 to have a bearing system so that they can rotate. In another embodiment the wheels may have separate axels, or may rest in bearing blocks (not shown) contained in protrusion 321 to form the wheel assembly. In a preferred embodiment the wheel assembly comprising protrusion 321 and wheels 320 would be placed such that it and its associated wheels would lie behind the rear bumper of golf cart 100, as shown in FIG. 1a. Other configurations are also possible, such as having four wheels, one near each corner of the storage unit, or three wheels, two spaced apart as shown in FIG. 3g items 320 and another single one which may fold or extend out of bottom protrusion 322 and allows steering when rolling the unit around. Bottom protrusion 322 here is also shown with channel 323, similar to previously shown channel 303, to allow for a center rib in the golf cart rear well. In a preferred embodiment bottom protrusion 322 does not extend rearwards past the rear surface of storage unit 316.

Figure 3H:
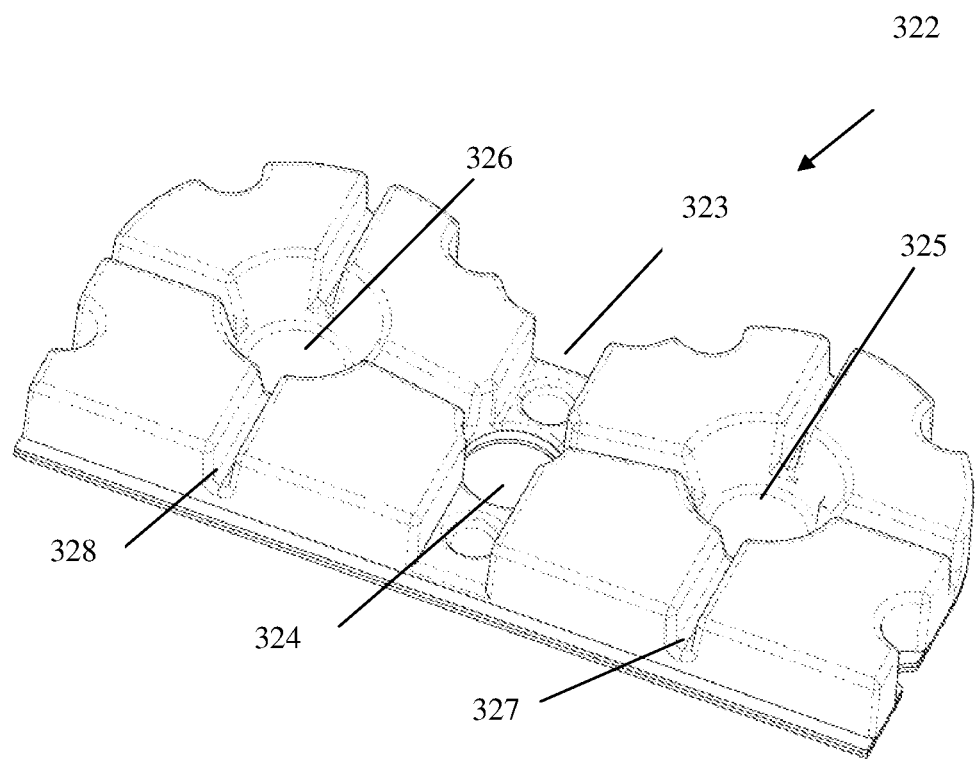
FIG. 3h shows a bottom view of a removable portion of the bottom protrusion of that embodiment of a storage unit.
Figure 3I:
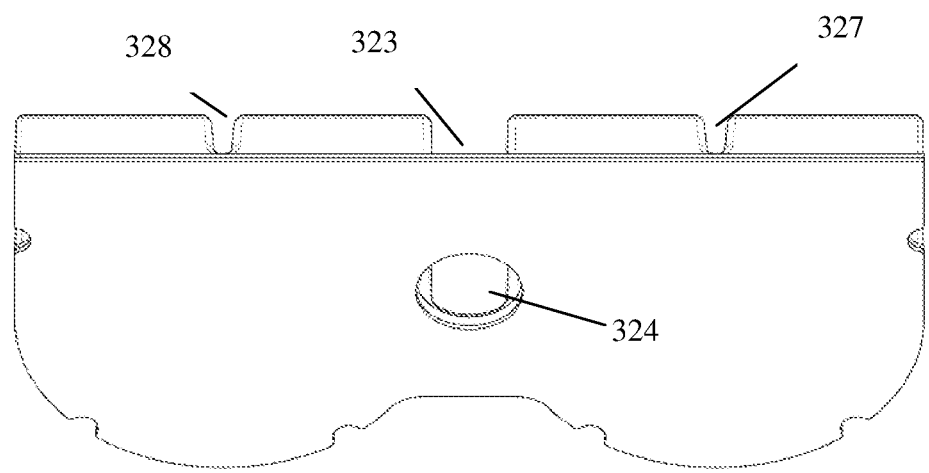
FIG. 3i shows a top view of a removable portion of the bottom protrusion of that embodiment of a storage unit.

FIG. 3h shows the bottom protrusion 322 in more detail, which may be detachable or may be a part of storage box 316. Channel 323 is shown, with a center hole 324 which is needed for upward protrusions on rear shelf wells certain golf cart models. Also shown are divots 325 and 326 in the centers of each side lobe protrusion, and valleys such as 327 and 328 in each side lobe protrusion. These, like the stiffening ribs 318 and 319 are ways to "corrugate" the downward protrusion to make it more rigid, since the downward protrusion acts as a lower attachment point for the whole storage box, while still allowing the protrusion to be hollow, using less material than a solid protrusion would. Clearly the stiffening valleys and center divots can have different numbers and placements on each side, according to the details of fabrication and use of the pieces. FIG. 3i shows the top side of the bottom protrusion, where it would be fastened to the bottom panel of the storage box, with the center channel 323, hole 324, and two of the stiffening valleys 327 and 328.

Figure 3J:
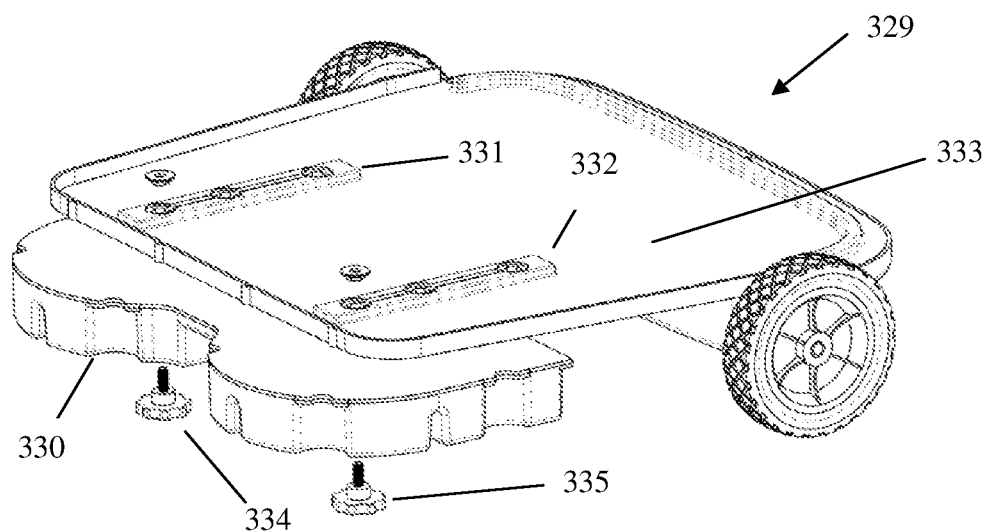
FIG. 3j shows a cutaway view of the bottom panel of the storage unit with attachment system for an adjustable removable bottom protrusion.
Figure 3K:
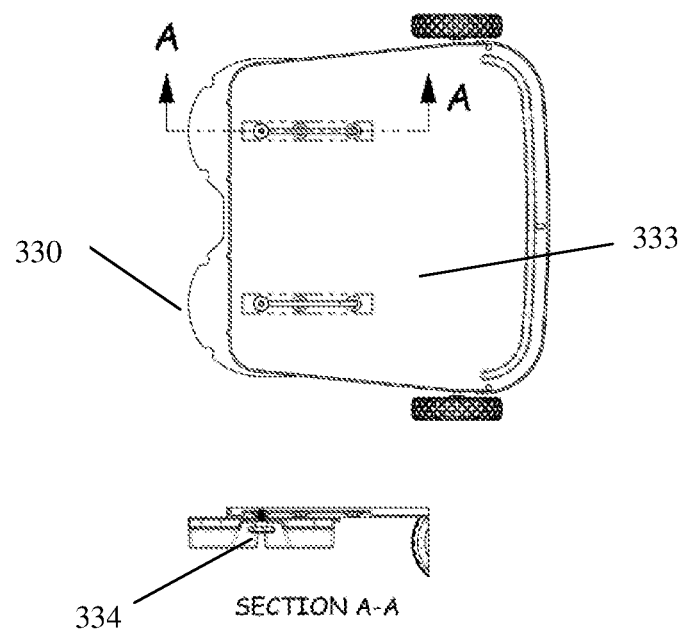
FIG. 3k shows a top and side view of that embodiment.

FIG. 3j shows an embodiment 329 of this invention with a fixed protrusion 330 having horizontal adjustment of its position. Two slots 331 and 332 are shown in the bottom panel 333 of the storage unit. Knobs on threaded rods or bolts can go through slots 331 and 332 to several different positions in the slots where there are countersunk holes, allowing nuts to fasten the protrusion into place with different amounts of extension behind the storage unit, as discussed in FIGS. 3a to 3c, to account for different golf cart rear shelf model configurations. In an alternative embodiment, no nuts are used, and there are merely blind holes in the underside of storage unit bottom panel 333 in a row such that the protrusion 330 can be fixed in place in different positions. In another alternative embodiment, slots and tabs can be used on the upper side of the protrusion 330 and the lower side of storage unit bottom panel 333 so that the protrusion 330 slides back and forth under the storage unit bottom panel 333. Knobs or pins 334 and 335 can then be attached to bottom protrusion 330 and spring loaded, such that they will drop into holes on the underside of the bottom panel 333 and fix bottom protrusion 330 into place in different specific locations to account for different models of golf cart. As with other features of this invention, the intent is to provide adjustability without needing tools. Note that in a preferred embodiment, knobs or pins 334 and 335 are in the center recesses or divots on each side of the bottom protrusion 330, shown in more detail as items 325 and 326 in FIG. 3h. FIG. 3k shows a top and section view of the same embodiment of FIG. 3h, illustrating storage unit bottom panel 333 and knob 334 recessed in a divot.

FIGS. 4a through 4d show an expanded view of the fitting 201 from FIG. 2a, upper rear fitting 400 to hold the storage unit on the back of a golf cart. Cross bracket 401 is the horizontal frame piece on the back of a golf cart to allow straps to hold two golf bags in place (205 from FIG. 2b). To this cross bracket 401 is fastened first vertical plate 402, by drilling two holes in cross bracket 401 and using bolts 403 and 404, which pass from rear plate 405 through the holes to first vertical plate 402 and are shown with the nuts holding them in place, though clearly these bolts can be reversed. Second vertical plate 406 is fastened to first vertical plate 402 with bolts or machine screws 407. Between the two vertical plates 402 and 406, is a recess and small plate 408, shown in FIG. 4c, on the rear of a bayonet probe 409. The channel formed between vertical plates 402 and 406 allows plate 408 to slide up and down, providing vertical adjustment of the bayonet 409 location. A slot 410 and set screw 411 can be used to lock the plate 408 and thereby bayonet 409 in place vertically. Since the horizontal location where the overall fitting 400 is mounted on horizontal frame piece 401 can also be adjusted during the mounting process, the combination of these features provides full horizontal and vertical adjustment of the location of the bayonet 409 so that it can be matched to its receiver 412 for different models of golf carts. This bayonet probe, mounted to the frame of the golf cart by using the vertical plates, extends into a receiver structure 412 mounted on rear panel 413 of the storage unit when the storage unit is attached to the golf cart. The receiver or receptacle 412 takes in the bayonet probe 409, and slider 414 slides up to lock the bayonet 409 in to the receiver 412 by using the widened head of bayonet 409, and thereby lock the storage unit on to the rear of the golf cart. Slider 414 has a narrower and a wider opening section, so that the bayonet can fit through a larger hole in the slider, then when the slider 414 is slid up, the wider head of the bayonet is kept inside the storage box by the narrower opening of the slider. Note that while vertical sliding 414 on receiver 412 is shown, clearly several other ways of retaining the bayonet could be used, such as with a circular slide. Varying thickness of the slider can be used to provide a tighter lock, if its narrower opening also has a thicker material, when the slider is in its bayonet locking position, the storage unit is pulled more snugly to the receiver 412 and thereby the horizontal frame piece 401. This can be seen in cross section FIG. 4c.

Figure 4A:
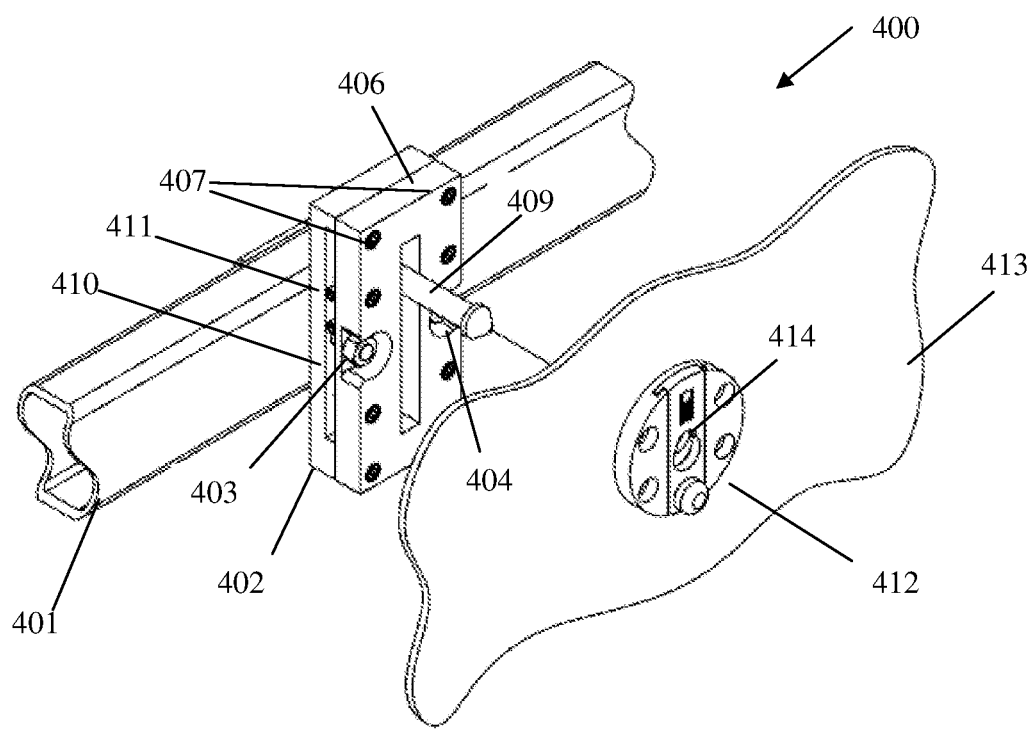
FIG. 4a shows a perspective view of an embodiment of an adjustable locking mechanism to fasten the upper portion of the storage unit to the rear of the golf cart.
Figure 4B:
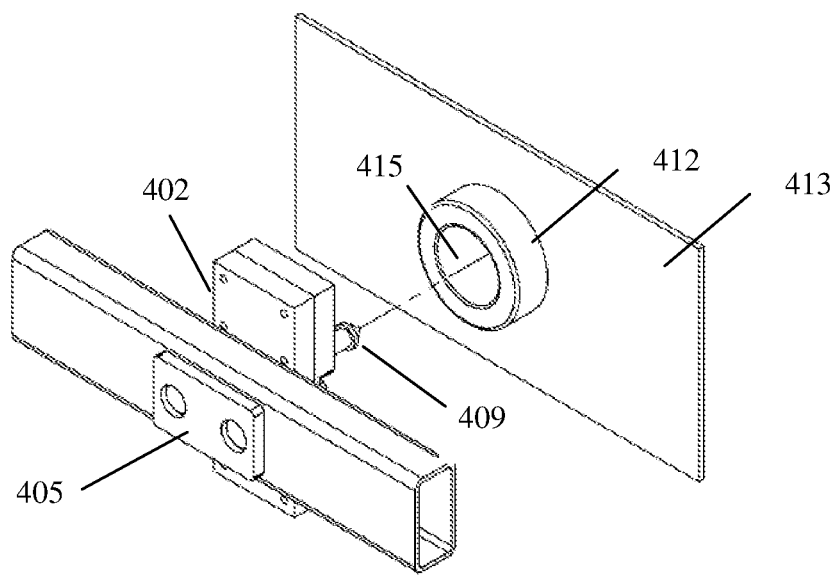
FIG. 4b shows a different perspective view of that embodiment.
Figure 4C:
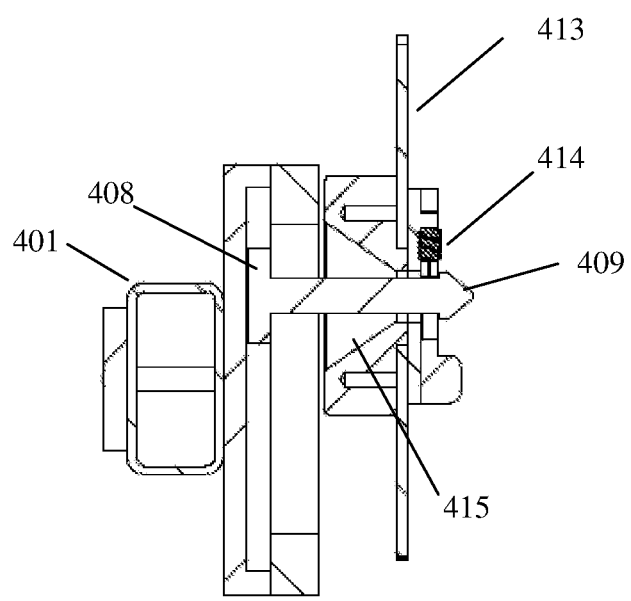
FIG. 4c shows a side view of that embodiment of the adjustable locking mechanism.
Figure 4D:
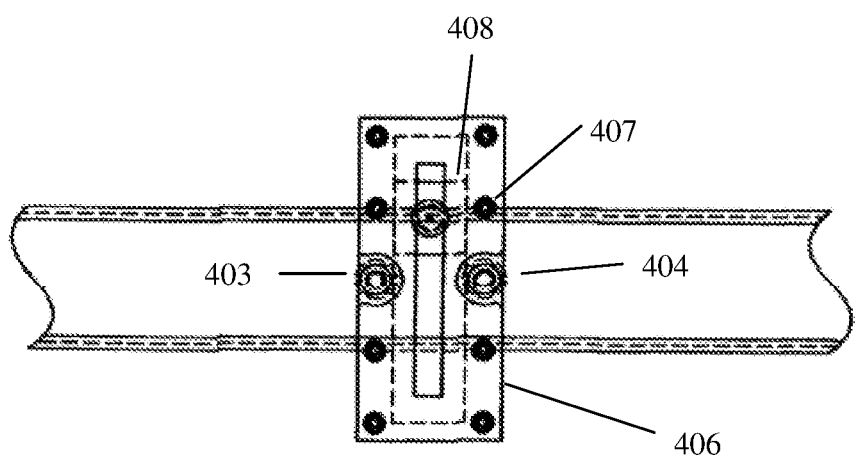
FIG. 4d shows a bracket portion of that embodiment of the adjustable locking mechanism.

FIG. 4d shows a view of the attachment part fastened to the golf cart frame, with second vertical plate 406 held to first vertical plate by bolts or machine screws 407, and first vertical plate held to the rear plate (not seen) by bolts or machine screws 403 and 404.

In a preferred embodiment, receiver 412 has a cone shaped entrance 415, with the wide opening of the cone facing outward from the rear panel of the storage unit so that any slight misalignment of the storage unit with the bayonet 409 mounting location on the golf cart frame is accommodated, and the bayonet head can slide through into the interior of the storage unit. In one embodiment, the receiver 412 is removable, and the storage unit would come with various holes in different locations to match frame 401 locations on different models of golf carts. Then a plug or plugs for openings matching a particular model of golf cart could be removed, and a receiver 412 or receivers installed in rear storage unit panel 413 so that they would be in the right place to mate with the bayonet assembly.

Note that for security, carriage style bolts could be used with the heads protruding on the side of the rear plate 405, which may require square cut holes to lock the carriage bolt head in place, and the nuts 403 and 404 recessed by making cutouts in second vertical plate 406. This feature, in combination with the sliding and locking of the bayonet means when the storage unit, here shown as just a piece 413 of a rear panel, is mounted, the vertical plates and attachment point 400 cannot be removed from cross bracket 401 because the storage unit blocks easy access to the nuts. This provides security for the contents of the storage unit, since the attachment point 400 cannot be removed from the cross bracket 401 when the storage unit is in place, and the storage unit cannot be removed from the attachment point when the storage unit is closed and locked, since there is no access to the interior which would permit moving slider 414 and releasing bayonet 409. Note that, of course, it is always possible to remove the storage unit by damaging, cutting off or destroying parts of the golf cart, frame, attachment point(s) and/or storage unit, but in the context of this invention it is intended to prevent removal of the storage unit short of such damage or destruction, just as a padlock provides a lock on a door so long as the lock is not cut off or the door damaged. Security is an important, though not the only, feature of this invention, since it is intended to act as a vehicle "trunk" on a vehicle which otherwise does not have one. If it were possible to remove the entire trunk easily, for example without using specific tools, it would not work as well for storing valuable items while unattended. Conversely, it is desirable in many embodiments of this invention, such as that shown in FIG. 4a, to be able to unlock the upper attachment point to release the bayonet and remove the storage unit from the golf cart without using tools providing one has access to the interior of the storage unit by, for example, unlocking its door.

In one embodiment of this invention for additional security, the attachment system 400 may comprise bolts whose heads are "carriage" style, not allowing for use of a wrench, coming from the golf cart frame, said bolts passing through the rear wall of the storage unit and having wrench or finger tightenable nuts inside the enclosed space of the storage unit 100, for example in the upper compartment behind panel 209 or behind doors 211 and 212. If carriage bolts are used, square cut holes may be needed at the head end to lock them in place. In this way, without access to the fastened or locked storage unit, it would be impossible to unbolt the removable storage unit and remove it from the vehicle. In alternate embodiments this end could be achieved by welding bolts onto the golf cart frame and having nuts inside the storage unit or by using "security" style fasteners with unusual heads and/or nuts inside or outside the storage unit or both to prevent easy removal of the storage unit by an unauthorized person.

Figure 4E:
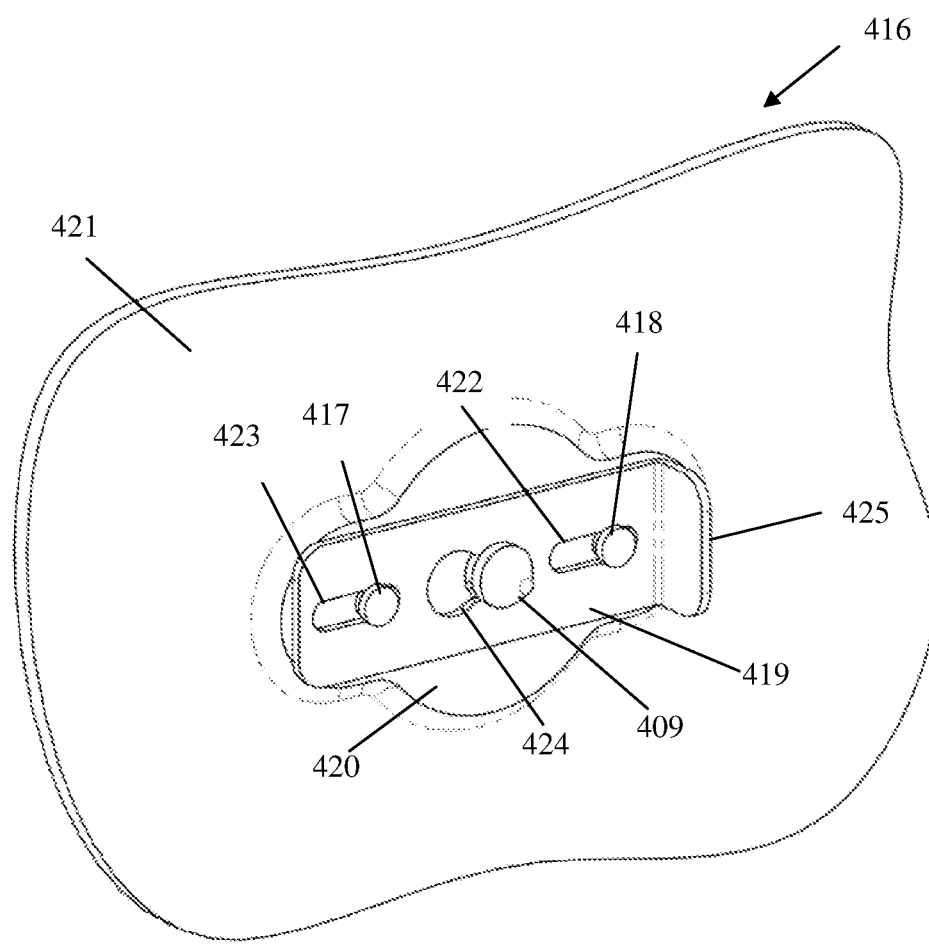
FIG. 4e shows a sliding bracket locking mechanism.

FIG. 4e shows another embodiment 416 of a slider mechanism to fasten bayonet 409 in to the storage unit. Bolts 417 and 418 hold sliding plate 419 on reinforced section 420 of storage unit rear panel 421 (shown only in part). Slots 422 and 423 allow plate 419 to slide back and forth, with one position (shown) having a smaller hole in a center slot 424 to hold bayonet 409 in place, and the other position having a larger hole in the center slot 424 to allow the bayonet 409 to slide out of the rear panel 421 of the storage unit. Angled section 425 of sliding plate 419 makes it easy to grasp the sliding plate 419 and slide it between the two positions, allowing unlocking of the upper attachment point and removal of the storage unit without using tools providing one has access to the interior of the storage unit.

Figure 4F:
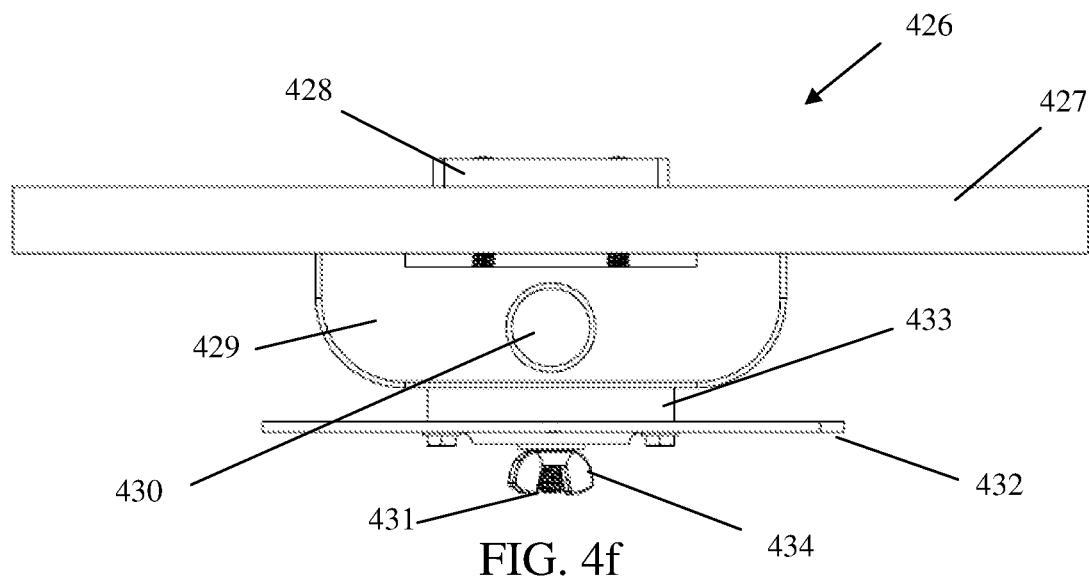
Figure 4G:
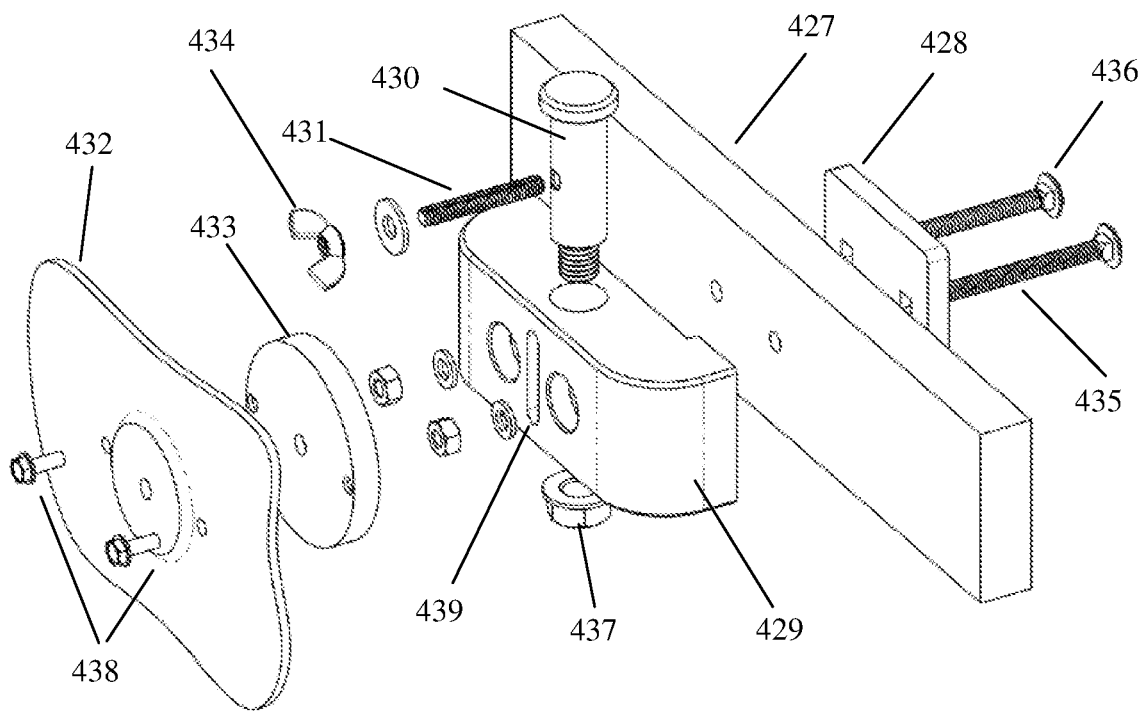
FIG. 4g shows an exploded view of that attachment bracket.

FIG. 4f shows another embodiment of an upper attachment point bracket 426. The bracket attaches to golf cart frame piece 427 (shown only in part) by using plate 428 to fasten bracket piece 429 to the frame piece 427. Then, pin 430 goes into bracket piece 429 and threaded rod 431 attaches into pin 430 and goes through the rear panel 432 of the storage box (shown only in part), using in a preferred embodiment a guide cone 433. This cone 433 may have an actual cone shaped profile with the wide end facing the bracket, or may merely have a large opening to make it easy to get threaded rod 431 through the rear of the storage unit panel 432. A wing nut 434 fastens the bracket 426 to the storage unit by threading onto the threaded rod 431 from inside the storage unit. Use of the wing nut 434 or an alternative such as a large, easily gripped knurled knob, when unscrewed, allows the threaded rod 431 to be pulled out through the cone 433 and remove the storage unit from the rear of the golf cart without using tools, providing one has access to the interior of the storage unit. FIG. 4g shows an exploded view of this assembly, where bolts 435 and 436 attach plate 428 to bracket piece 429 by sandwiching golf cart frame piece 427 between them and using nuts in recessed holes in bracket piece 429 on bolts 435 and 436. In a preferred embodiment of this invention bolts 435 and 436 are carriage bolts, to provide security by preventing easy removal of the bracket and thereby the storage unit from the golf cart frame without cutting or damaging parts. A nut 437 holds pin 430 in place in its hole. In a preferred embodiment, pin 430 is slightly tapered to fit a bracket which is a standard feature in that location on a rear golf cart frame piece of certain golf cart models. In that way, the same pin 430, threaded rod 431 and cone 433 system can be used with either the standard bracket on the certain golf cart models, or the bracket 426 shown in FIG. 4f and FIG. 4g. Note that for different specific golf cart models, the diameter and taper of pin 430 may be slightly different when used with the standard bracket for that model, as the hole sizes in that standard bracket vary. Bolts 438 are also shown holding alignment cone 433 onto the rear panel 432 of the storage unit, but in an alternative embodiment the alignment cone may be molded into the rear panel 432, along with any reinforcing or stiffening structures needed. In another embodiment, the bolts 438 may be inserted from the bracket side of the assembly instead of from the storage unit side.

FIG. 4g also shows slot 439 in bracket piece 429. This slot allows for vertical height adjustment to be made between the position threaded rod 431 extends from pin 430 on the bracket and the position of the center hole of cone 433 on the rear of the storage unit, to allow for slight variations in manufactured dimensions of the golf cart bracket, golf cart rear well and storage unit. The vertical height adjustment may be made by having multiple holes in different vertical locations in pin 430 for insertion of the threaded rod 431, or by having washers to insert between the flat head of pin 430 and bracket piece 429 to raise or lower pin 430 in the hole of bracket piece 429. Other methods of adjustment may occur to one skilled in the art. In another embodiment, which may be combined with the embodiment shown in FIG. 4c, threaded rod 431 or bayonet 409 may pass through golf cart frame pieces 427 or 401, respectively, and extend towards the storage unit far enough to allow fastening of the storage unit to the golf cart frame without intermediate parts such as pin 430, bracket piece 429, and/or bracket pieces 402 and 406. One or more spacers on the threaded rod 431 or bayonet 409 may be used as needed to brace the rear panel 432 of the storage unit on the threaded rod 431 or bayonet 409 when the storage unit is tightened down.

In another embodiment of this invention, a U-shaped locking structure could be used, which wraps around a frame piece of the golf cart, and which has two ends which extend far enough to protrude into the storage unit. These ends could be threaded, and have nuts which are only unfastenable from inside the storage unit. Alternatively, the ends of the U-shaped structure could be ridged, like a hose barb or zip tie, such that a fastening device could be slid along the end from inside the storage unit and locked down on the protruding barbs or ridges, thereby locking the storage unit in place at the upper attachment point. Alternatively, there could be a plate which slides onto the two ends and which has either nuts, in the case of screw threaded ends, or sliding locking devices, in the case of barbs or ridges on the ends, used to hold the plate in place and thereby lock the upper attachment point and storage unit into place on the rear of the golf cart in such a way that it cannot be removed without access to the interior of the storage unit. The bottom of the U shaped locking structure could have different cross sections, such as square or triangular, rather than rounded like the bottom of a U, depending on the cross section of the frame piece onto which the locking structure is placed, and these other cross sections are intended to be covered in this U shaped locking structure embodiment. An advantage of this embodiment of the invention is that potentially inexpensive, "off the shelf" U-shaped structures could be used to provide the desired function of an upper attachment point which can only be unfastened with access to the inside of the storage unit.

These upper attachments could be made by a variety of other methods, including, but not limited to, "C clamps", which could include slideable arms such as found in a bench vise or "butterfly" nuts, pin and socket joints, whether horizontal or vertical, quick release joints, spring clamps, straps, and other systems as known to those skilled in the art, though these may not provide the security feature of the horizontal bayonet attachments disclosed in this invention. Attachment mechanisms only on the golf cart 100 or on the storage unit 104 may be used, with the expectation that there would be surfaces or structural members present on the other object suitable for attachment or clamping. Other types of fastening systems would suggest themselves to one skilled in the art, and are intended to be covered in this disclosure.

Figure 5A:
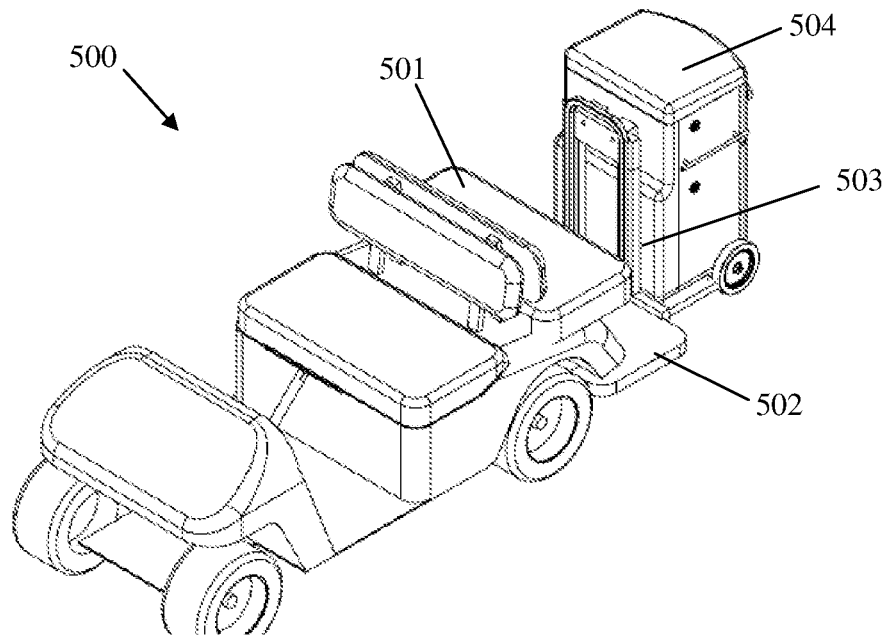
FIG. 5a shows a perspective view of an embodiment of a bracket system to hold the storage unit on the back of a golf cart.

Another embodiment of this invention is shown in FIG. 5a and is intended to be mounted on a golf cart 500 without a rear well for golf club bags. This type of golf cart is often set up for 4 people, with a rear facing seat 501 and an approximately flat platform 502 for the people in the rear to rest their feet on. In this case, a framework 503 may be attached to the rear of the golf cart platform 502 so that the container or storage unit 504 can be attached to the framework 503.

Figure 5B:
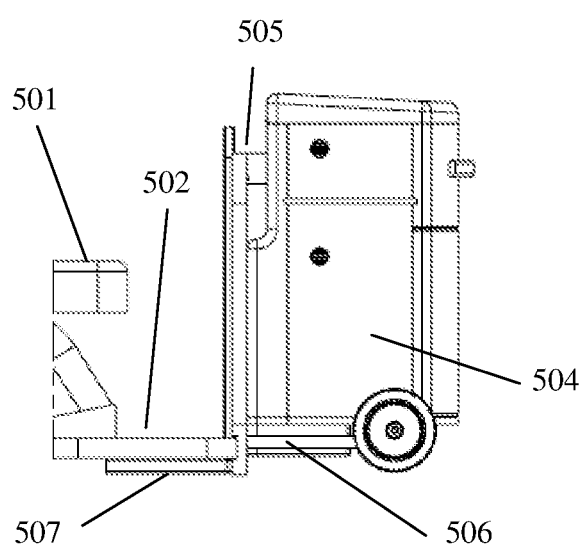
FIG. 5b shows a side view of that embodiment.

FIG. 5b shows a side view of the storage unit 504 mounted to the frame on the back of the golf cart, with a portion of seat 501 and platform 502. Visible here are upper attachment point(s) 505, lower frame cutout 506 to hold a lower protrusion of the storage unit 504, and receiver(s) 507 mounted under platform 502 which can take the forks of framework 503, discussed in more detail in a following figure. Note that as shown in this figure, in a preferred embodiment of this invention, the storage unit protrudes rearwards beyond the limit of the lower frame cutout 506. This is a useful feature of the invention, as it provides more storage volume inside the storage unit, making it useful for a wider range of storage and transport, while minimizing the rearward protrusion of the lower frame cutout 506 when the storage unit is not present. While this embodiment shows roughly half of the storage unit bottom protruding behind the back of the golf cart, other ratios would also work for this invention. It is desirable in this embodiment to have at least some portion of the storage unit, equal to at least 10% of the depth of the storage unit (front to back distance between the lower parts of the outsides of the front and rear panels of the storage unit), extending behind the rear of the lower frame cutout 506, so that the storage unit has enough depth to provide reasonable storage space. It is also desirable to not have too much extension of the storage unit past the rear end of the vehicle, no more than 80% of the depth of the storage unit, so that it does not take up too much space parking or become a driving hazard. In a further embodiment, the extension of the storage unit is between 40% and 60% of its depth.

Figure 5C:
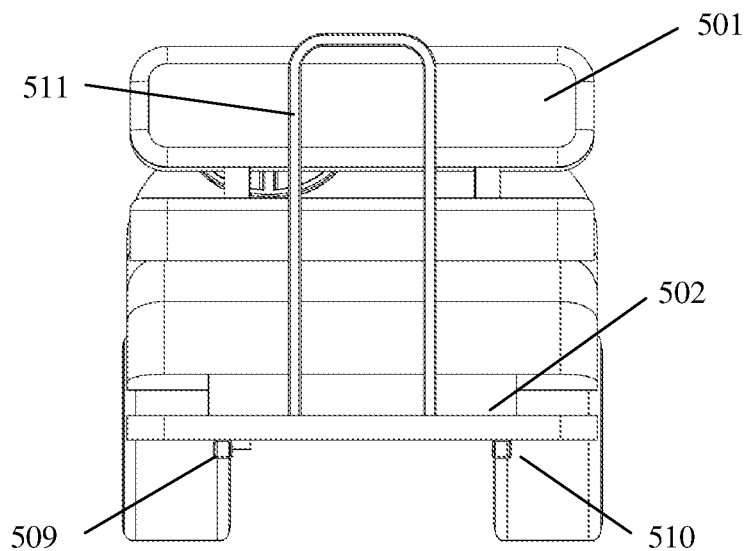
FIG. 5c shows a rear view of the golf cart without the storage unit.

FIG. 5c shows a rear view of the golf cart without the storage unit 504 or container holding framework 503. Seat 501 and platform 502 are visible, with receiver tubes 509 and 510 shown under the platform 502. These would take the forks of framework 503. U-shaped golf cart frame piece 511 is a typical safety bar on the rear of a 4-seater golf cart, which extends upward at least 2 feet or 24 inches from a rear-most part of the rear shelf on that type of golf cart, and may be used to provide mounting locations for one or more upper attachment points for storage unit 504, as will be discussed in a following figure.

Figure 5D:
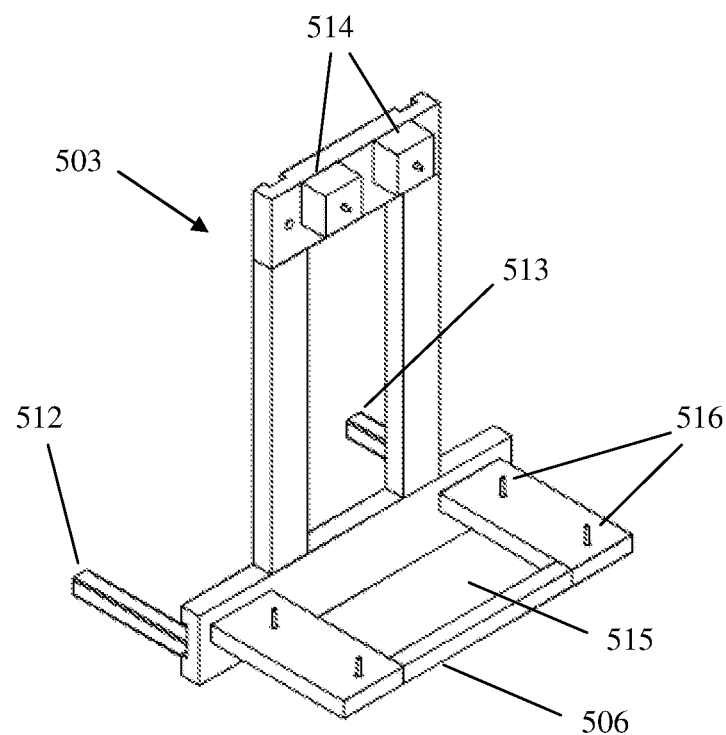
FIG. 5d shows a perspective view of the bracket portion of an embodiment.

FIG. 5d shows a perspective view of storage unit framework 503. Shown are forks 512 and 513 which would go into receivers 509 and 510. They may be fastened into the receivers, or they may just take the weight of the storage unit while upper attachment points 514 hold the storage unit in place. Note that while pairs of forks, receivers and upper attachment points are shown, any number necessary for secure attachment of the storage unit, including one of each, may be used. Cut out opening 515 in lower horizontal frame piece 506 is shown to hold a lower protrusion of the storage unit and fasten the bottom in place. Note that while a rectangular cut out is shown, in a preferred embodiment the cut out can be shaped to match, for example but not limited to, the lower protrusion shown in FIG. 3d. In this way the same storage unit could be interchanged between a cart with a golf bag well 102 and a 4-passenger golf cart with a rear platform 402 and framework 403. Upward protruding bolts 516 are also shown on left and right segments of the frame around cut out 515, these may optionally be used to hold the storage unit more securely in place. While they are shown on the left and right segments of the frame 506 around the cut out 515, clearly they could vary in number, and be distributed in various configurations around the perimeter of the lower horizontal frame piece 506 around the cut out 515.

Figure 5E:
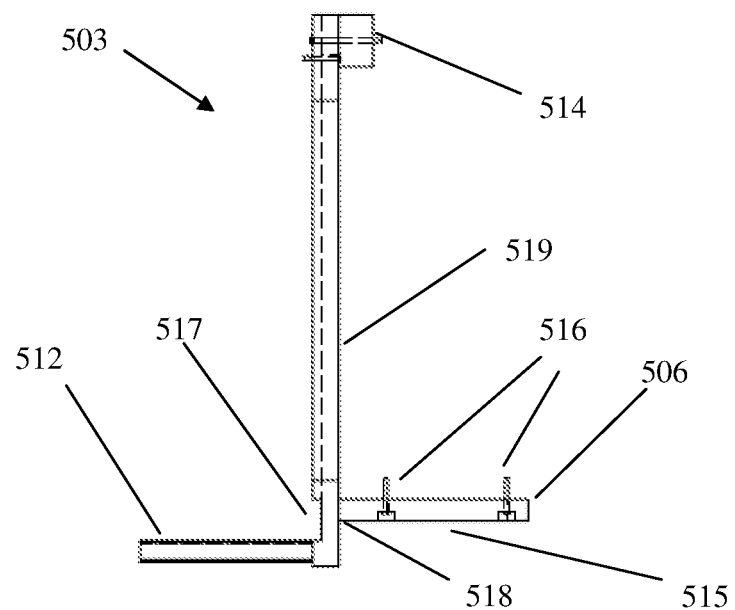
FIG. 5e shows a side view of the bracket portion of that embodiment.

FIG. 5e shows a side view of the rear mountable framework 503. Visible are fork 512, upper attachment point 514, the side frame piece of cut out 515, and bolts 516. Note also notch 517, this would fit over the lip of platform 502 and help the platform provide support and structural rigidity for the framework 503 and thereby the storage unit 504. Also note that in a preferred embodiment, a hinge or hinges would be located at 518, adjacent to where the lower horizontal frame piece 506 framework meets the vertical section 519 of the framework 503. This would allow lower horizontal frame piece 506 to fold up against the vertical section 519 of the framework 503 when the storage unit is not in place, so that the lower horizontal frame piece 506 would not protrude rearward from the golf cart and create a safety hazard. In a preferred embodiment, there would be framing all the way around cut out 515, to provide hinge 518 attachment points and additional rigidity to lower horizontal frame piece 506. An additional safety feature is that, as discussed earlier, cut out framework 506 does not protrude rearward as far from the back of the golf cart as the storage unit 504 does, since the storage unit overhangs the framework to the rear of the vehicle. The framework 506 would not be as visible as the storage unit. This embodiment, wherein the cut out framework 506 folds up against the vertical section 519 of the framework 503, also allows the downwards protrusion on the bottom of the storage unit to occupy the full size of the bottom of the storage unit, and have little or no (0%) extension of the storage unit behind the cut out framework 506, since the cut out framework 506 does not extend dangerously far to the rear behind the golf cart as it could if it did not fold up.

Figure 5F:
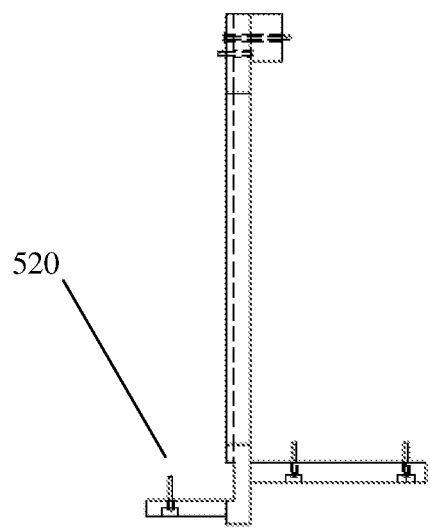
FIG. 5f shows a side view of the bracket portion of another embodiment.

FIG. 5f shows another embodiment of the framework 503, wherein instead of forks sliding into receivers, the framework 503 is simply bolted to the bottom of the platform 502 or golf cart lower undercarriage using bolts 520. Obviously this framework could be attached by other methods known to those in the art, such as welding.

Figure 5G:
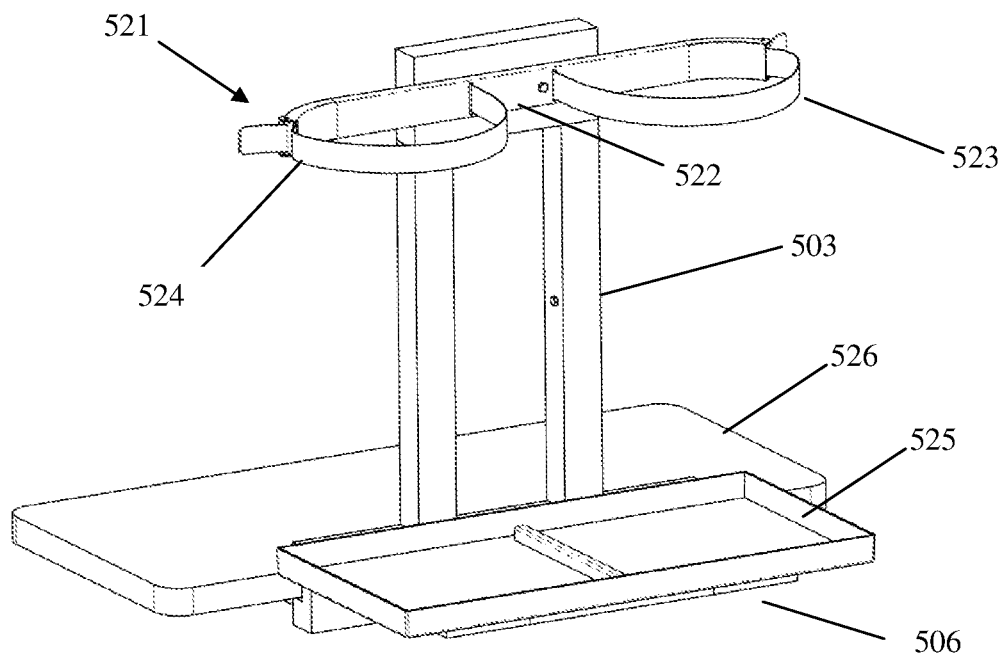
FIG. 5g shows a perspective view of an embodiment of the invention where a lower tray and upper strap system are used to allow two golf club bags to be held by the bracket system.

FIG. 5g shows an assembly 521 which allows mounting of golf bags onto the framework 503 discussed earlier. Mounted to an upper part of the framework 503 is a crossbar 522, which has mounts for two loops 523 and 524. Those loops would secure the upper parts of two golf bags. A removable tray 525 is placed into lower cut out framework 506, the tray having a lower protrusion similar to the one used for the storage unit to fit snugly in the opening of cut out framework 506. In this way, the same framework 503 plus 506 could be used for either mounting a storage unit or carrying golf clubs. It is also possible to make the lower cut out framework 506 opening smaller, and have a smaller protrusion on the bottom of tray 525. This has the advantage of making lower cut out framework smaller, but removes the interchangeability of the lower protrusion on the storage unit, so a different lower protrusion would have to be used, or in the case of an adjustable lower protrusion, it would have to be adjusted. Normally the rear of a golf cart which has the 4-seat arrangement the framework 503 is designed for cannot carry golf clubs in a secure way because it has no rear well or loops, so this provides additional functionality. This mounting of tray 525 may be by bolts, screws, clamps, or other methods known to those skilled in the art. As described for previous embodiments, the framework 503 mounts behind rear platform 526 (also shown as 502 of FIG. 5a) of the golf cart.

Figure 5H:
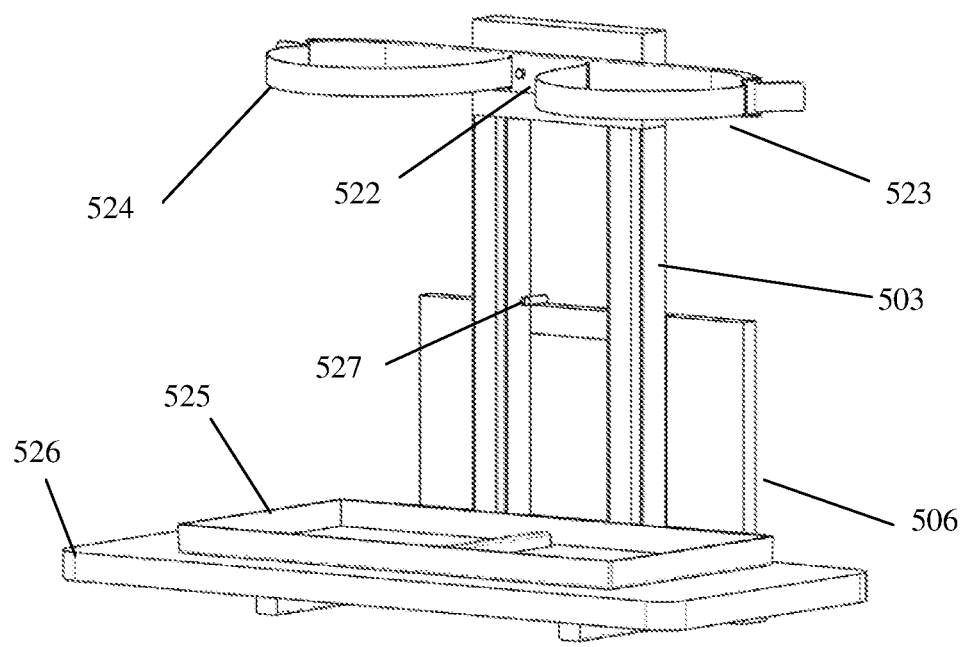
FIG. 5h shows a perspective view of another variant of this embodiment where the tray and strap system are reversed, facing towards the front of the golf cart, and the bracket part is folded up against the frame.

FIG. 5h shows another embodiment of this supplemental golf bag holding system, where crossbar 522 holding loops 523 and 524 is mounted facing the other way, towards the front of the golf cart. Similarly, tray 525 is mounted on rear platform 526 (also shown as 502 of FIG. 5a) of the 4 seater golf cart, and thereby facing towards the rear facing seats of the 4 seater golf cart and front of the golf cart. In a preferred embodiment the downward protrusion from tray 525 is removed so that tray 525 can sit flat on rear platform 526. This mounting of tray 525 may be by bolts, screws, clamps, or other methods known to those skilled in the art. In this way, on a 4-seater golf cart, two sets of golf clubs can be carried if no passengers are riding on the rear two seats, and simultaneously the storage unit can be mounted on the rear framework 503. In this figure, the cut out rear framework 506 is shown folded up against framework piece 503, as discussed in FIG. 5e. A latch 527 is shown to hold the folded frame 506 up in place against 503. It would also be possible to have tray 525 fold up from this side against 503 using hinges, if it were desired to leave the tray 525 mounted on the golf cart but get it out of the way of passengers' feet, and remove or flatten loops 523 and 524.

Figure 6A:
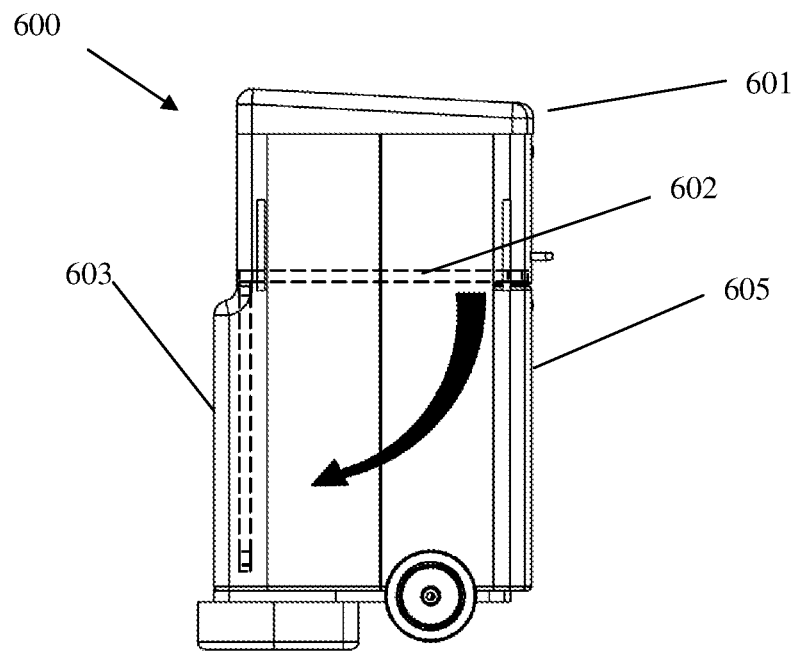
FIG. 6a shows a side view of an embodiment of a folding storage unit.

FIG. 6a shows an embodiment of a folding storage unit 600. In this embodiment, the panels are made of a rigid, solid material without a specific framework. In this embodiment, folding lid 601 may be opened to allow interior shelf 602 separating the top and bottom compartments of the storage unit 600 to be folded down, as shown by the arrow, to meet rear panel 603. Note that while this embodiment shows the shelf 602 folding down along a rear panel 603, it could also be folded up, down or up along a side wall 604, down or up along a front wall 605, or removed entirely. If additional shelves or interior horizontal or vertical panels are used, they would similarly be folded out of the way or removed.

Figure 6B:
FIG. 6b shows a perspective view of a partially folded version of that embodiment of the folding storage unit.

When the interior shelf or shelves are out of the way, the sides can be folded "accordion style" as shown in FIG. 6b, wherein a center hinge 606 along the side wall folds in, while two hinges 607 and 608 on the back and front corners of the storage unit 600 allow the side panels to fold inwards. A corresponding set of three hinges on the other side of the storage unit would allow that side panel to fold in. Note that this brings the front doors back along the bottom panel 609 of the storage unit.

Figure 6C:
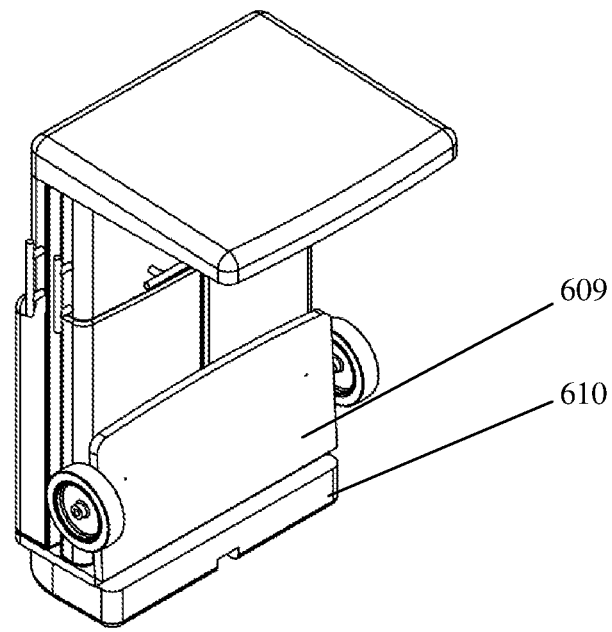
FIG. 6c shows a side view of a more folded version of that embodiment of the folding storage unit.

FIG. 6c shows how, when in this embodiment the side wall folds in along hinges 607 and 608, part of the bottom panel 609 can be folded up against the storage unit 600. In a preferred embodiment the fold takes place where the bottom protrusion 610 sticks down, though in alternative embodiments the fold may be in different locations, including if the bottom protrusion is made up of multiple parts or pillars, including some of the bottom protrusion, depending on how flat the side walls fold.

Figure 6D:
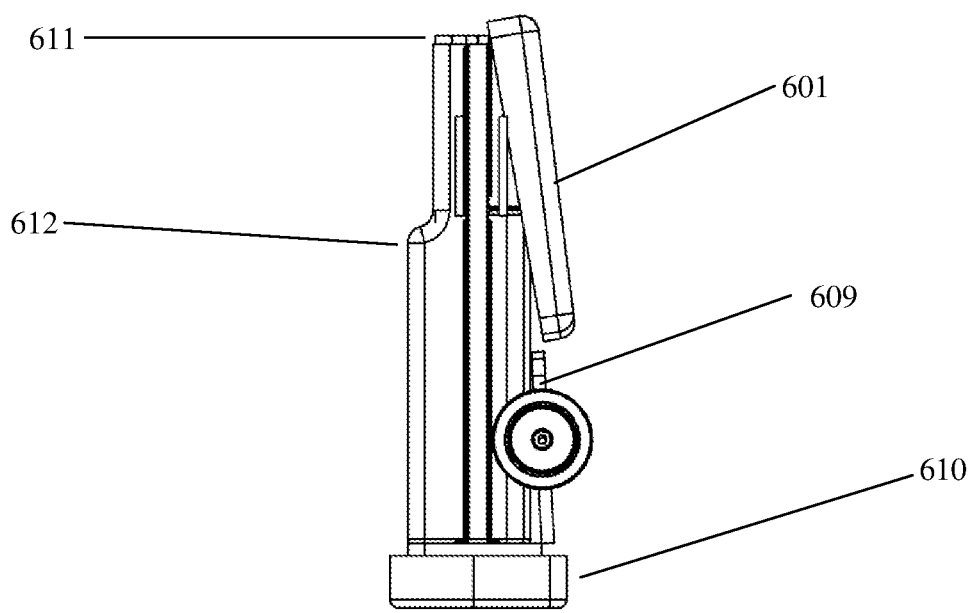
FIG. 6d shows a side view of a fully folded version of that embodiment of the folding storage unit.

FIG. 6d shows the completely folded storage unit 600 in this embodiment. Sliding hinge 611 has allowed lid 601 to slide forward enough to fold down over the rest of the box, while the part of bottom panel 609 has folded up against the rest of the box, providing a much more compact final storage unit. In another embodiment, rather than a sliding hinge 611, a segmented top lid 601 (not shown) could be used where only a rearward portion of the top lid would fold down, and the part of the top lid closer to the front of the golf car, the amount needed to accommodate the back indent 612 and folded side panels, would be fixed. In this embodiment of the folding storage unit it is envisioned that the total depth (front to back distance between the lower parts of the outsides of the front and rear panels of the storage unit) of the storage unit is reduced by at least 20%, to 80% of the depth it previously occupied, preferably reduced to 50% to 20% of the depth it previously occupied. This reduction depends on factors such as, but not limited to, curvature of panels, number of hinges, location of hinges, design of hinges, and type of bottom protrusion. Note also that the folded storage unit could be hung on a wall or otherwise stored out of the way in a garage or storage area. In this way, the golf cart could still be used to hold golf clubs for playing golf, while allowing for attachment of a storage unit as needed for other functions such as grocery shopping. Note that in other embodiments, if bottom protrusion 610 is segmented (not shown), for example having only posts at each corner for bracing into a bag well or rear cart framework, it could fold more compactly against the body of the storage unit, and/or allow bottom panel 609 to fold more compactly against the rest of the storage unit.

It should be understood that the foregoing description is only illustrative of the embodiments. It should also be understood that the embodiments disclosed herein may be used individually or in any suitable combination thereof. Various alternatives and modifications can be devised by those skilled in the art without departing from the embodiments. Accordingly, the present embodiments are intended to embrace all such alternatives, modifications and variances.

What is claimed is:

1. A storage unit framework attached to the rear of a golf cart for mounting a storage unit, the golf cart having an approximately flat rear shelf and a pair of rear wheels, there being an interior distance between the rear wheels consisting of the distance between innermost portions of the rear wheels, comprising: a golf cart frame piece extending upwardly at least 2 feet from the part of the rear shelf which is generally furthest to the rear on the golf cart, a storage unit framework which is attached behind the rear shelf of the golf cart vehicle, the storage unit framework attached to a removable storage unit by at least one upper attachment point and one lower attachment point, the upper attachment point being at least 30% of the distance of the rear height of the storage unit up from the bottom of the storage unit, the storage unit having a width of substantially the interior distance between the rear wheels of the golf cart, the storage unit being removably attachable to the storage unit framework, the storage unit framework having a vertical portion and a horizontal portion, the horizontal portion having a cut out opening, the storage unit comprised of one or more rigid panels enclosing an approximately cuboid volume, the storage unit having a bottom panel which faces downwards, a front panel which faces in the direction of the rear of the golf cart, two side panels, and a rear panel which faces in the direction of the front of the golf cart, the storage unit having a protrusion extending downwards from a portion of the bottom panel of the storage unit into the cut out opening of the horizontal portion of the storage unit framework when the storage unit is attached to the storage unit framework, the storage unit further comprising a horizontally extending lower attachment device which extends into the protrusion of the storage unit and into a vertical face of the interior of the cut out of the horizontal portion of the storage unit framework, the horizontally extending lower attachment device locking down the bottom of the storage unit.

2. The storage system of claim 1, wherein the horizontally extending lower attachment device passes from the vertical face of the interior of the cut out of the horizontal portion of the storage unit framework through a hole in a corresponding downwards extending face of the bottom protrusion of the storage unit.

3. The storage system of claim 1, wherein the horizontally extending lower attachment device passes from a downwards extending face of the bottom protrusion of the storage unit through a hole in the corresponding vertical face of the interior of the cut out of the horizontal portion of the storage unit framework.

4. The storage system of claim 2, wherein there are two of the horizontally extending lower attachment devices.

5. The storage system of claim 3, wherein there are two of the horizontally extending lower attachment devices.

6. The storage system of claim 4, wherein the horizontally extending lower attachment devices extend in two different directions.

7. The storage system of claim 5, wherein the horizontally extending lower attachment devices extend in two different directions.

8. The storage system of claim 4, wherein the two different directions the horizontally extending lower attachment devices extend are opposite directions.

9. The storage system of claim 1, wherein the horizontal portion having a cut out opening has at least one hole passing from the top surface of the storage unit framework horizontal portion to the bottom surface of the storage unit framework horizontal portion.

10. A storage system mounted on the rear of a golf cart, the golf cart having a rear shelf with a well, comprising; a removable storage unit having substantially the entire rear width of the well, the storage unit being removably attachable to the rear of the golf cart, the storage unit having a bottom panel in a horizontal plane, the storage unit having a protrusion extending downwards from a portion of the bottom panel horizontal plane of the storage unit into the well, the protrusion not extending downwards substantially further than the depth of the well when the storage unit is attached to the rear of the golf cart, the protrusion making contact with at least one of the upper surface of the well bottom and any of the four interior side walls of the well, the protrusion thereby acting as a lower attachment point to hold the storage unit on the back of the golf cart, the storage unit having an upper attachment point on the upper rear panel of the storage unit the upper attachment point being at least 30% of the distance of the rear height of the storage unit up from the bottom panel of the storage unit, the storage unit comprised of one or more rigid panels enclosing an approximately cuboid volume, the storage unit further comprising a horizontally extending lower attachment device which extends into the protrusion of the storage unit and into an interior side wall of the well, the horizontally extending lower attachment device locking down the bottom of the storage unit.

11. The storage system of claim 10, wherein the horizontally extending lower attachment device passes from an at least partially vertical side wall of the well through a hole in a corresponding downwards extending face of the bottom protrusion of the storage unit.

12. The storage system of claim 10, wherein the horizontally extending lower attachment device passes from a downwards extending face of the bottom protrusion of the storage unit through a hole in the corresponding at least partially vertical side wall of the well.

13. The storage system of claim 11, wherein there are two of the horizontally extending lower attachment devices, each passing from an at least partially vertical side wall of the well through a hole in a corresponding downwards extending face of the bottom protrusion of the storage unit.

14. The storage system of claim 12, wherein there are two of the horizontally extending lower attachment devices, each passing from an at least partially vertical side wall of the well through a hole in a corresponding downwards extending face of the bottom protrusion of the storage unit.

15. The storage system of claim 13, wherein the horizontally extending lower attachment devices extend in two different directions.

16. The storage system of claim 14, wherein the horizontally extending lower attachment devices extend in two different directions.

17. The storage system of claim 10, wherein the two different directions the horizontally extending lower attachment devices extend are opposite directions.

18. The storage system of claim 11, wherein the two different directions the horizontally extending lower attachment devices extend are opposite directions.

* * * * *